(12) United States Patent
Imamura

(10) Patent No.: US 7,251,288 B2
(45) Date of Patent: Jul. 31, 2007

(54) WIRELESS COMMUNICATION TRANSMITTER AND RECEIVER

(75) Inventor: Kimihiko Imamura, Ichihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 754 days.

(21) Appl. No.: 10/204,624

(22) PCT Filed: Feb. 22, 2001

(86) PCT No.: PCT/JP01/01311

§ 371 (c)(1),
(2), (4) Date: Aug. 22, 2002

(87) PCT Pub. No.: WO01/63812

PCT Pub. Date: Aug. 30, 2001

(65) Prior Publication Data

US 2003/0012297 A1    Jan. 16, 2003

(30) Foreign Application Priority Data

Feb. 22, 2000   (JP) .............................. 2000-043959
May 9, 2000    (JP) .............................. 2000-135411

(51) Int. Cl.
*H04L 27/00*   (2006.01)
(52) U.S. Cl. ...................................... 375/295; 375/342
(58) Field of Classification Search ................ 375/295, 375/316, 355, 364–366, 340, 342, 343, 350; 370/332, 335, 345, 350, 509–510, 512–513, 370/349, 471
See application file for complete search history.

(56) References Cited

U.S. PATENT DOCUMENTS

| | | | | | |
|---|---|---|---|---|---|
| 5,726,981 A | * | 3/1998 | Ylitervo et al. | ............. | 370/332 |
| 5,838,672 A | * | 11/1998 | Ranta | .......................... | 370/335 |
| 6,141,373 A | * | 10/2000 | Scott | .......................... | 375/150 |
| 6,584,164 B1 | * | 6/2003 | Tuukkanen | .................. | 375/365 |
| 6,594,248 B1 | * | 7/2003 | Karna et al. | ................ | 370/342 |

FOREIGN PATENT DOCUMENTS

| | | | |
|---|---|---|---|
| CA | 2220647 A | | 5/1998 |
| EP | 1041790 A2 | | 10/2000 |
| EP | 1049302 A1 | | 11/2000 |
| JP | 11-127131 A | | 5/1999 |

OTHER PUBLICATIONS

Schmidl et al., IEEE International Conference, vol. 3, pp. 1301-1306 (1996).

* cited by examiner

*Primary Examiner*—Khanh Tran
(74) *Attorney, Agent, or Firm*—Birch, Stewart, Kolasch, & Birch, LLP

(57) ABSTRACT

A wireless communication transmitter includes: an encoder (1) for encoding signals of information; a preamble signal portion (7) for storing a preamble signal of a known signal sequence; and an addition portion (5) for adding the preamble signal to the encoded signals of information and is characterized in that at least part of the preamble signal has periodicity of Tw/N (Tw: symbol length, N: an integer equal to 1 or greater) determined depending on the difference in the communication system of transmission.

22 Claims, 41 Drawing Sheets

US 7,251,288 B2

WIRELESS COMMUNICATION TRANSMITTER AND RECEIVER

This application is the national phase under 35 U.S.C. § 371 of PCT International Application No. PCT/JP01/01311 which has an International filing date of Feb. 22, 2001, which designated the United States of America.

TECHNICAL FIELD

The present invention relates to a wireless communication transmitter and a wireless communication receiver which, when a plurality of communications systems including Internet connection, MPEG2 data transmission, DV (digital video) signal transmission and the like are handled in the same frequency band, can discriminate each system from others at an early stage, making the best use of the preambles added preceding data symbols.

BACKGROUND ART

Recently, mobile communications systems aiming at seamless connection with cable systems have drawn attention. At the same time, in view of efficient frequency use there is also a movement toward letting a variety of systems share the same frequency band in common as shown in FIG. 41, instead of permitting one system to occupy one specific frequency.

With this trend, there have been attempts to put Internet connection, MPEG2 data transmission, DV (digital video) signal transmission and other various communications systems into practice within the same frequency band.

However, since when these different systems are handled using wireless transmission, the required QoS (quality of service) differs from others depending on each system, there may be differences in the physical layer (modulation scheme, interleaver, error correction coding, etc.,), MAC (media access control) layer (differences in frame length and frame structure) and others, as shown in FIG. 42. Accordingly, in order to demodulate these different systems correctly, it is necessary to identify each system after the data has been demodulated.

For this reason, the conventional technologies use methods whereby, no matter whether a signal is needed or not, the signal has to be once demodulated in its physical layer and MAC layer, and then if the data is determined to be a desired one, the demodulation is continued, or cancelled otherwise.

However, the above prior art technologies have suffered the problems that it takes time to identify the service (system) and also extra consumption of power is needed to demodulate unnecessary signals.

The present invention has been achieved in view of the above problems, it is therefore an object of the present invention to provide a wireless communication transmitter and a wireless communication receiver which can detect an arrival of a signal of the desired system, simply and precisely at an early stage, from a plurality of systems sharing the same frequency band.

DISCLOSURE OF INVENTION

In accordance with the first invention of this application, a wireless communication transmitter includes: an encoder for encoding signals of information; a preamble signal storage for storing a preamble signal of a known signal sequence; and an addition portion for adding the preamble signal to the encoded signals of information, wherein at least part of the preamble signal has periodicity of Tw/N (Tw: symbol length, N: an integer equal to 1 or greater) determined depending on the difference in the communication system of transmission (cf. FIG. 3).

In accordance with the second invention of this application, the preamble signals include signals having a plurality of different periods, Tw/N (cf. FIG. 12).

In accordance with the third invention of this application, a wireless communication transmitter includes: an encoder for encoding signals of information; a preamble signal storage for storing a preamble signal of a known signal sequence; and an addition portion for adding the preamble signal to the encoded signals of information, wherein at least part of the preamble signal has periodicity of Tw/N (Tw: symbol length, N: an integer equal to 1 or greater) and part of the signal of the periodicity, Tw/N, is inverted depending on the communication system of transmission (cf. FIGS. 15, 21 and 19).

In accordance with the fourth invention of this application, the signal of the period, Tw/N, is inverted every other period (cf. FIG. 25).

In accordance with the fifth invention of this application, part of the signal which is inverted every other period is further inverted (cf. FIG. 28).

In accordance with the sixth invention of this application, a wireless communication transmitter includes: an encoder for encoding signals of information; a preamble signal storage for storing a preamble signal of a known signal sequence; and an addition portion for adding the preamble signal to the encoded signals of information, wherein at least part of the preamble signal is adapted to have periodicity of Tw/N (Tw: symbol length, N: an integer equal to 1 or greater) and the part of the signal of the period, Tw/N, is delayed in phase, every other period of Tw/N, by a lag L ($-\pi<L<\pi$) determined depending on the difference in communication system of transmission (cf. FIG. 32).

In accordance with the seventh invention of this application, a wireless communication receiver includes: a decoder for decoding signals of information sent from a wireless communication transmitter; and a preamble signal discriminating portion for discriminating between preamble signals of known signal sequences, wherein the preamble signal discriminating portion comprises: a delay correlator for calculating the correlation value between the received signal and a signal of the received signal delayed by Tw/N (Tw: symbol length, N: an integer equal to 1 or greater); and a correlation output comparator for comparing the output from the delay correlator with a threshold related to the reception signal level (cf. FIG. 22).

The eighth invention of this application is configured so that a plurality of the delay correlators are provided and the correlation output comparator compares the amplitude of the output from each delay correlator with the threshold related to the reception signal level (cf. FIG. 5).

The ninth invention of this application is configured so that the correlation output comparator includes: a first comparator for comparing a first input signal with the product of the reception signal level and a constant; a second comparator for comparing a second input signal with the product of the reception signal level and a constant; a first AND circuit for implementing an AND operation between the outputs from the first and second comparators; and a second AND circuit for implementing an AND operation between the output from the first comparator and the inversion of the output from the second comparator (cf. FIG. 9).

The tenth invention of this application further includes a third AND circuit for implementing an AND operation between the output from the first AND circuit and a delayed signal of the output from the second AND circuit (cf. FIG. 14).

The eleventh invention of this application is configured so that the correlation output comparator includes: a first comparator for comparing a first input signal with the product of the reception signal level and a constant; a second comparator for comparing a second input signal with the product of the reception signal level and a constant; a third comparator for comparing a third input signal with the product of the reception signal level and a constant; a first AND circuit for implementing an AND operation between the outputs from the first, second and third comparators; a second AND circuit for implementing an AND operation between the outputs from the first and second comparators and the inversion of the output from the third comparator; and a third AND circuit for implementing an AND operation between the output from the first comparator and the inversions of the outputs from the second and third comparators (cf. FIG. 11).

The twelfth invention of this application is further includes: a first correlation output comparator for comparing the amplitude of the output from the delay correlator with the threshold related to the reception signal level; and a second correlation output comparator for comparing the real part and/or imaginary part output from the delay correlator with the threshold related to the reception signal level (cf. FIG. 16).

The thirteenth invention of this application is configured so that the second correlation output comparator includes: a first comparator for comparing the input signal with the product of the reception signal level and a constant (positive number); and a second comparator for comparing the input signal with the product of the reception signal level and a constant (negative number) (cf. FIG. 27).

The fourteenth invention of this application further includes: an AND circuit for implementing an AND operation between a delayed signal of the output from the first comparator and the output from the second comparator (cf. FIG. 18).

The fifteenth invention of this application further includes: an AND circuit for implementing an AND operation between the output from the first comparator and a delayed signal of the output from the second comparator (cf. FIG. 30).

The sixteenth invention of this application further includes: a first AND circuit for implementing an AND operation between the output from the first comparator and a delayed signal of the output from the second comparator; and a second AND circuit for implementing an AND operation between a delayed signal of the output from the first comparator and the output from the second comparator (cf. FIG. 31).

In accordance with the seventeenth invention of this application, a wireless communication receiver includes: a decoder for decoding signals of information sent from a wireless communication transmitter; and a preamble signal discriminating portion for discriminating between preamble signals of known signal sequences, wherein the preamble signal discriminating portion comprises: a delay correlator for calculating the correlation value between the received signal and a signal of the received signal delayed by Tw/N (Tw: symbol length, N: an integer equal to 1 or greater); and a correlation output comparator for comparing the real part output and imaginary part output from the delay correlator with a threshold related to the reception signal level (cf. FIG. 33).

The eighteenth invention of this application is configured so that the correlation output comparator includes: a sign determining circuit which compares the real part output and the imaginary part output from the delay correlator with the reception signal level; and a correlation output comparing circuit having the outputs from the sign determining circuit connected to NOT and AND gates (cf. FIG. 35).

The nineteenth invention of this application is configured so that the sign determining circuit includes: a first comparator for comparing the input signal with the product of the reception signal level and a constant (positive number); and a second comparator for comparing the input signal with the product of the reception signal level and a constant (negative number) (cf. FIG. 36).

In accordance with the twentieth invention of this application, a moving average calculating portion for calculating a moving average of the output from the delay correlator is provided so that preambles are identified based on the moving average value (cf. FIG. 38).

In accordance with the twenty-first invention of this application, the signal having the periodicity of Tw/N is generated so that $MAX|S(t)|^2/AVE|S(t)|^2$ is equal to or smaller than 3 dB, where S(t) is the time signal when the data sequence is subjected to the inverse fast Fourier transform (IFFT).

BEST MODE FOR CARRYING OUT THE INVENTION

Figure 1:
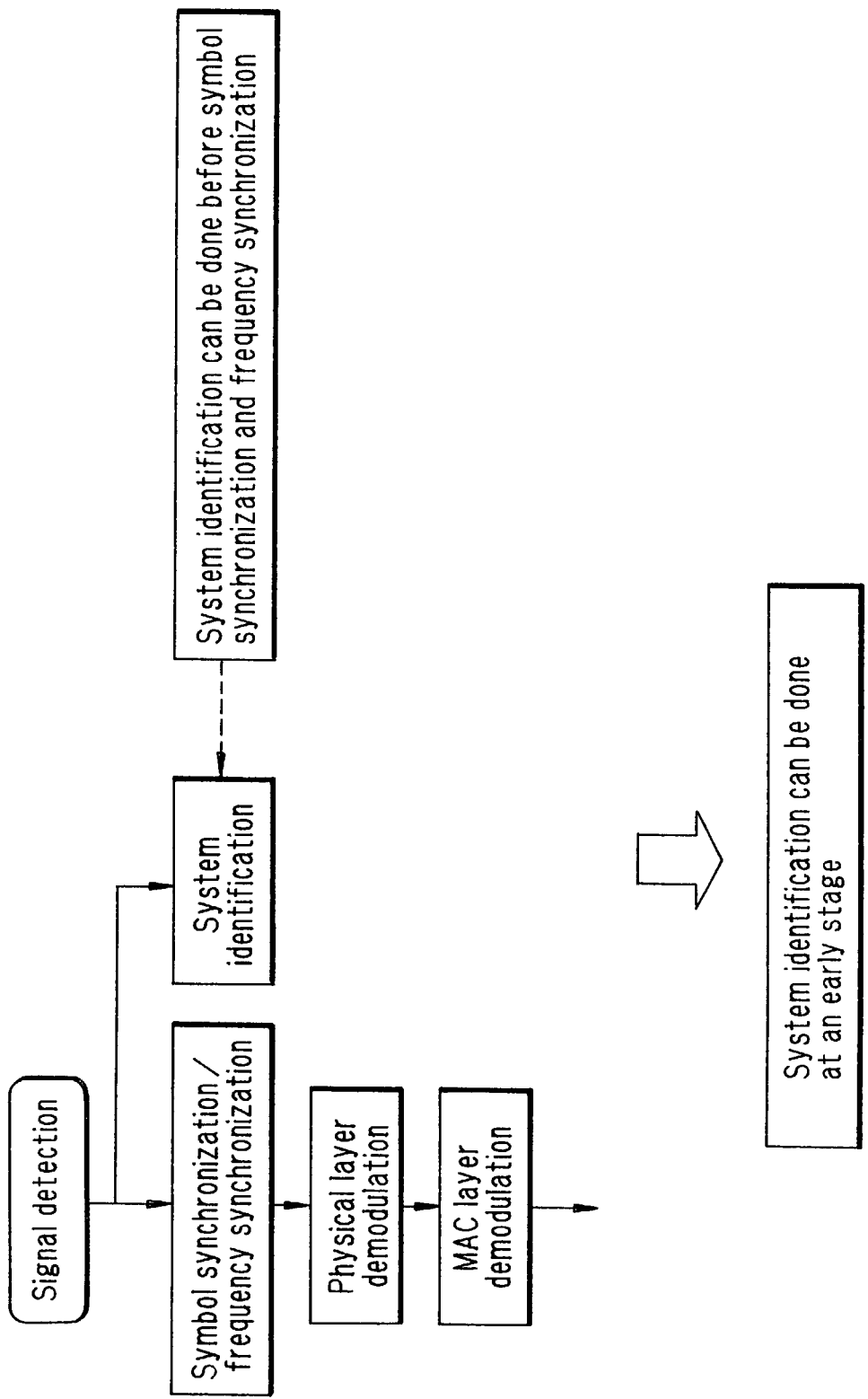
FIG. 1 is an illustrative view showing the capability of identifying between systems at an early stage by determination of preambles.

Herein, the embodiments of the present invention will be described in detail by taking the example of a transmitter-receiver using an OFDM (orthogonal frequency division multiplexing) signal. First of all, the present invention is essentially directed to determine the system in an early stage before performing symbol period/frequency synchronization as shown in FIG. 1, by making use of preambles each having a different periodicity and allotted to a different system.

THE FIRST EMBODIMENT

Now, the first embodiment of the present invention will be described with reference to FIGS. 2 to 11. In the present embodiment, signals each having a periodicity of Tw/N (Tw: symbol length and N: an integer equal to 1 or greater) are used as preambles, and each system is adapted to have a unique preamble having a different period Tw/N, so that the preamble (the system) can be identified before establishment of synchronization in the receiver.

Figure 2:
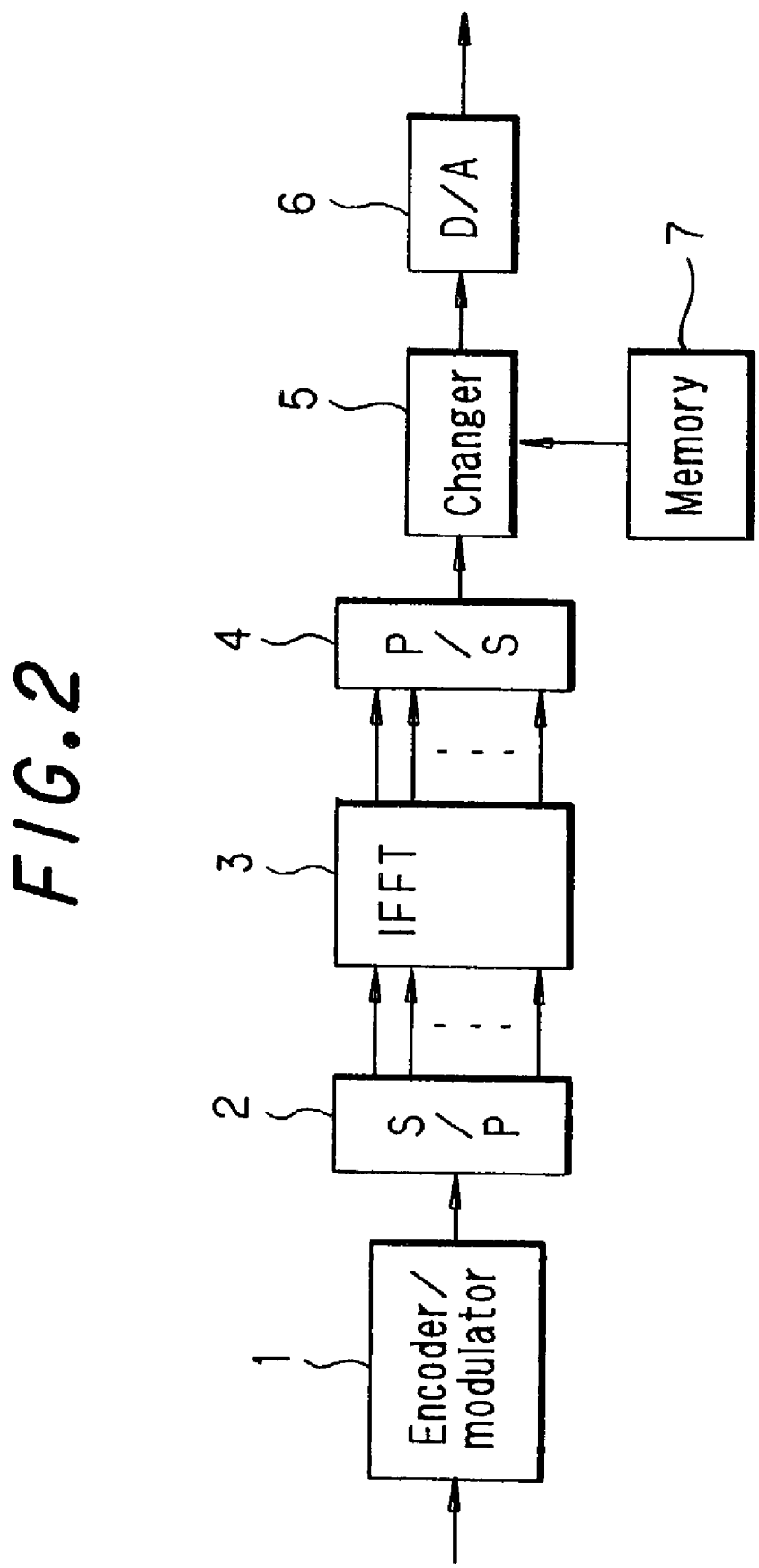
FIG. 2 is a block diagram showing a schematic configuration of an OFDM transmitter in accordance with the first embodiment of the present invention.

FIG. 2 is a block diagram showing a schematic configuration of a transmitter in the present embodiment. In FIG. 2, 1 designates an encoder/modulator for modulating signals of information; 2 a S/P (Serial to Parallel) for performing serial to parallel conversion; 3 an IFFT (Inverse Fast Fourier Transform) for converting frequency signals into time signals; 4 a P/S (parallel to Serial) for performing parallel to serial conversion; 7 a memory for storing a preamble signal added preceding data symbols; 5 a changer for switching between the preamble signal from memory 7 and the output from S/P 4; and 6 a D/A converter (Digital to Analog Converter).

It should be noted that the configuration of a transmitter shown in FIG. 2 is a mere example and that the present invention can be applied to single carrier modulation, spread spectrum (SS) modulation and other configurations, by appropriately modifying S/P 2, IFFT 3, P/S 4 and the like.

Figure 3:
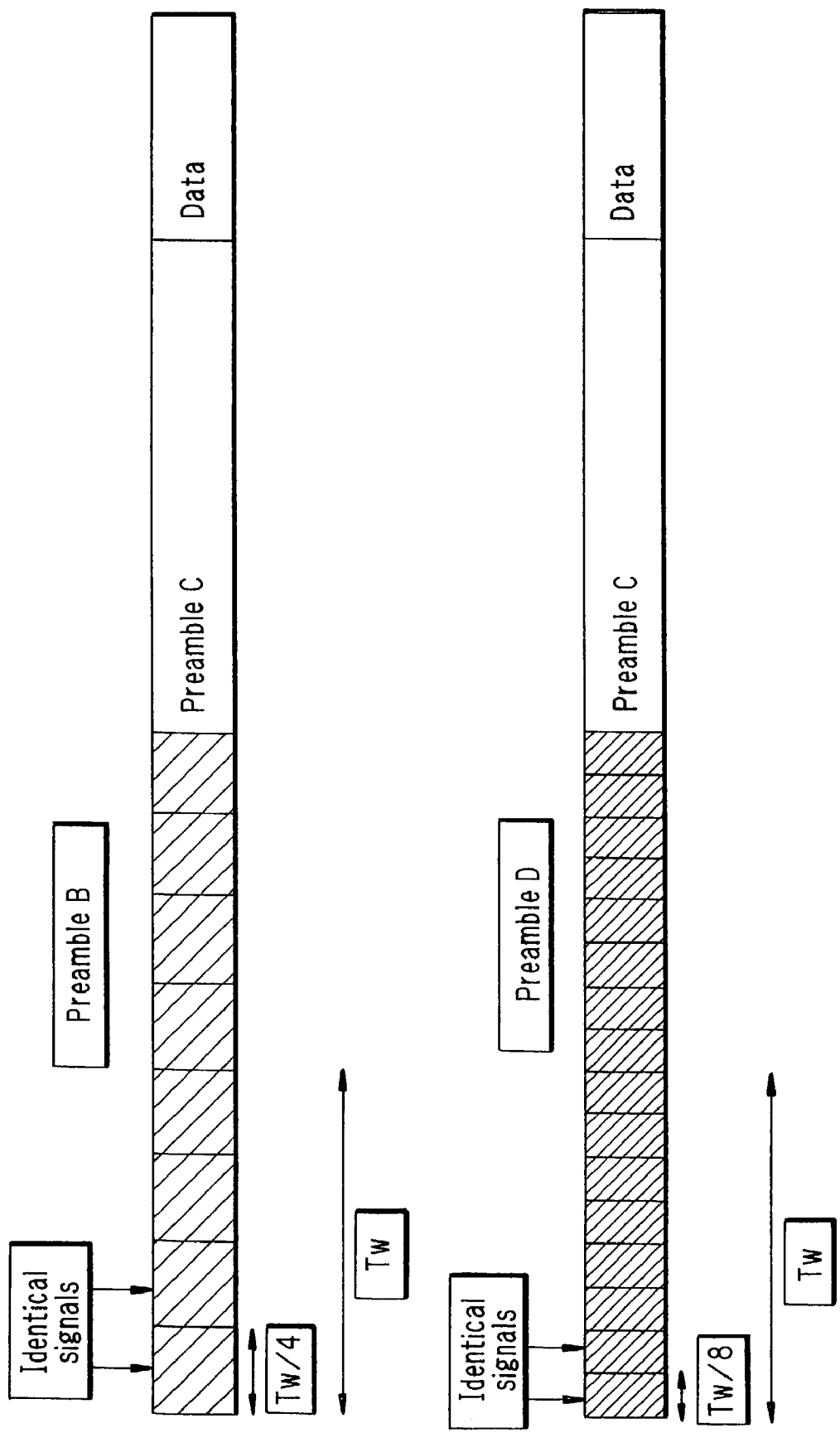
FIG. 3 is an illustrative view showing signals containing two types of preambles (preambles B and D) used in the first embodiment of the present invention.

The data transmitted from this transmitter contains, in part of a preamble (a known signal sequence being used for synchronization and the like), a periodic signal of Tw/N (Tw: symbol length, N: an integer equal to 1 or greater) unique to each system, as shown in FIG. 3. Here, the signal for N=4 will be called preamble B and the signal for N=8 will be called preamble D. Here, preamble C should also be part of a preamble.

In this way, use of the preambles, each having different periodicity and allotted to the different systems, makes it easy for the receiver to distinguish a difference in system. Next description will be made about this.

Figure 4:
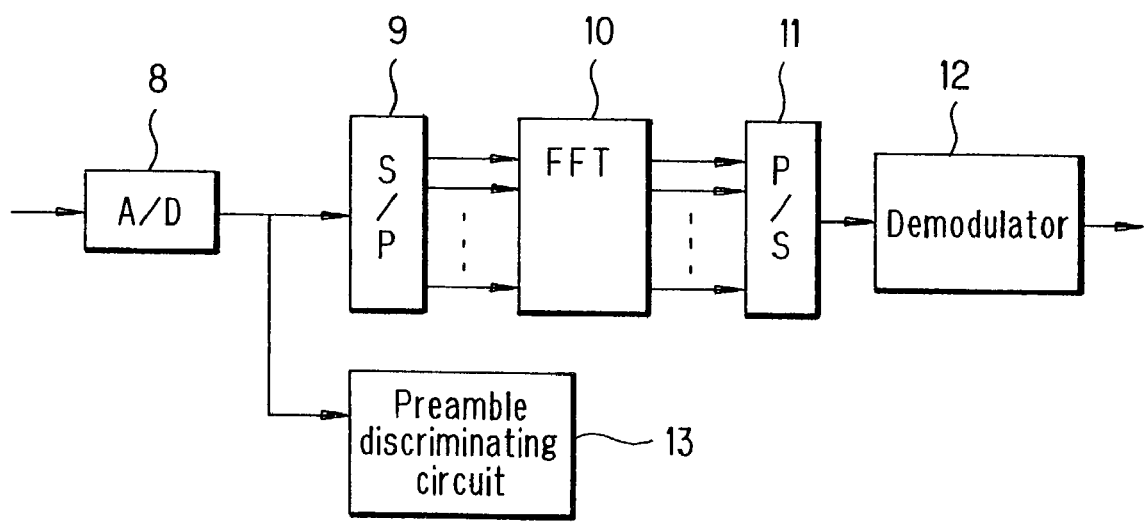
FIG. 4 is a block diagram showing a schematic configuration showing an OFDM receiver in accordance with the first embodiment of the present invention.

FIG. 4 is a block diagram showing a schematic configuration of a receiver of the present embodiment. In FIG. 4, 8 designates an A/D converter (Analog to Digital Converter) for performing A/D conversion of received signals; 9 a S/P (parallel to serial converter) for performing parallel to serial conversion of the output from A/D converter 8, 10 a FFT for converting time signals into frequency signals, 11 a P/S (parallel to serial converter) for performing parallel to serial conversion of the output from FFT 10, 12 a decoder for decoding the output from P/S 11, 13 a preamble discriminating circuit for determining the preamble based on the output from A/D converter 8.

First, the configuration of a preamble discriminating circuit 13D when two kinds of preambles having different periods (Tw/4 and Tw/8) are handled will be described with reference to FIG. 5. Preamble discriminating circuit 13D is comprised of: delay correlators 14B and 14D, each computing the value of correlation between the received signal and the delayed signal of the received signal by Tw/N (Tw: symbol length N: equal to 1 or greater); amplitude calculating circuits 19 and 20 for calculating the amplitudes of the outputs from delay correlators 14B and 14D; and a correlation output comparing circuit 15D for discriminating between the preambles (identifying the system) by comparing the outputs from amplitude calculating circuits 19 and 20 with a threshold determined based on the reception signal level.

Figure 6:
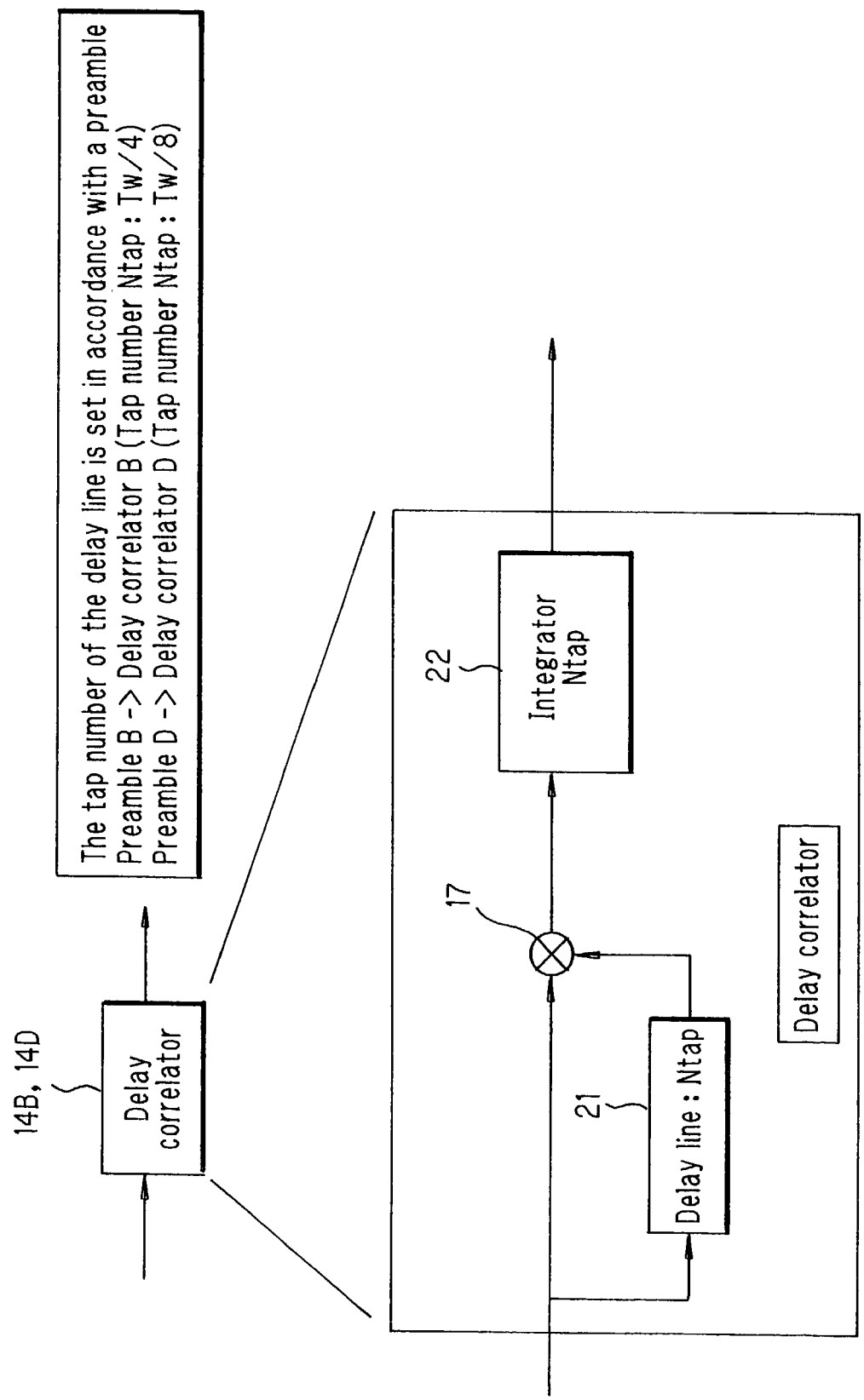
FIG. 6 is a block diagram showing one constructional example of a delay correlator in the first embodiment of the present invention.

As shown in FIG. 6, delay correlators 14B and 14D herein are each composed of an Ntap tap delay line 21, a complex multiplier 17 for the input signal and the delayed signal by delay line 21 and an integrator 22 for adding up complex multiplication results a predetermined number of times. Here, in delay correlator 14B and delay correlator 14D, N-tap lines are set with Tw/4 and Tw/8, respectively.

Figure 7:
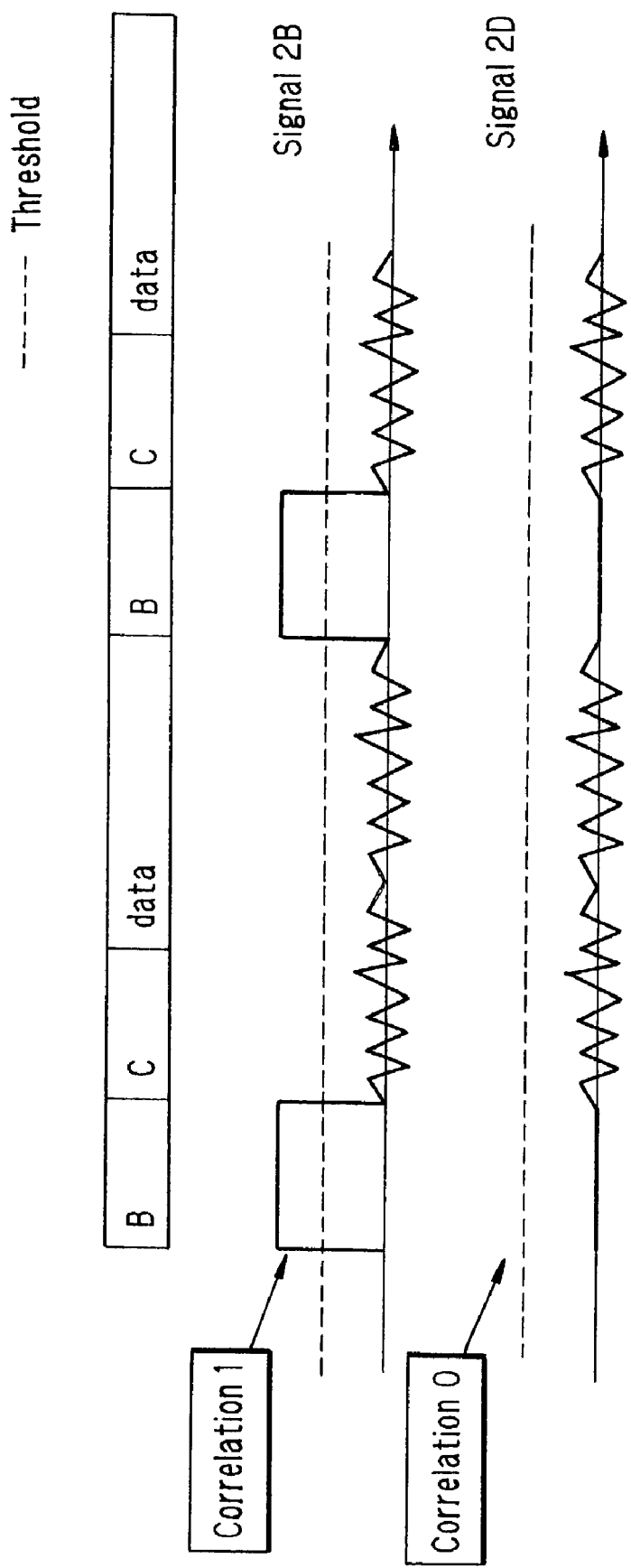
FIG. 7 is an illustrative view showing a delay correlator output (amplitude value) when a preamble B is received in the first embodiment of the present invention.
Figure 8:
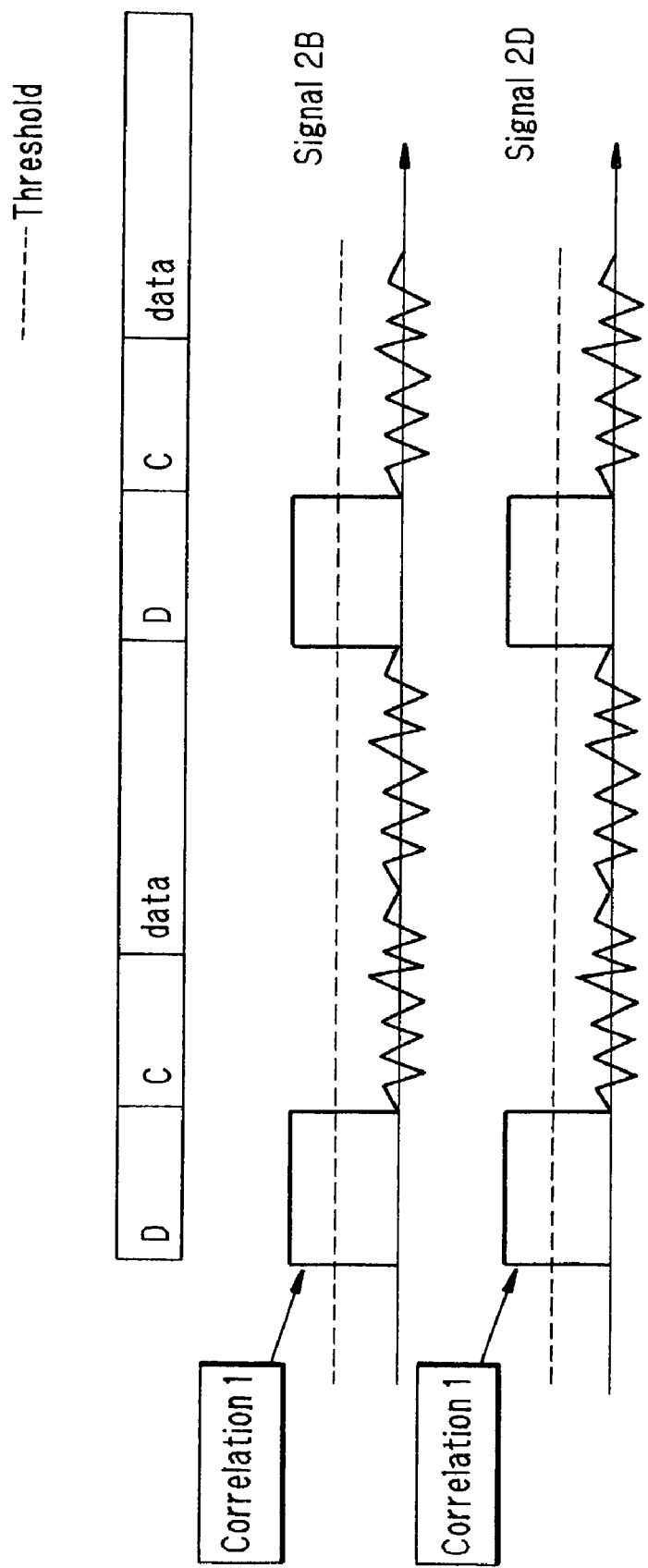
FIG. 8 is an illustrative view showing a delay correlator output (amplitude value) when a preamble D is received in the first embodiment of the present invention.

Next, preamble discrimination will be described with reference to FIGS. 7 and 8. First, when a signal containing preamble B (a signal having a period of Tw/4) has been received, the signal 2B (the amplitude of delay correlator 14B) and the signal 2D (the amplitude of delay correlator 14D) present respective waveforms as shown in FIG. 7. That is, only signal 2B exceeds the threshold level. In contrast, when a signal containing preamble D (a signal having a period of Tw/8) has been received, both the signal 2B and the signal 2D exceed the threshold level, as shown in FIG. 8.

As understood from the above fact, it is possible to perform preamble discrimination (system identification) without effecting synchronization or other processes. Here, the correlation value used herein is one which is normalized based on the power of the received signal. Further, since the correlation value will present the same value for a long period of time, it is obvious that noise and other influences can be easily removed.

Figure 9:
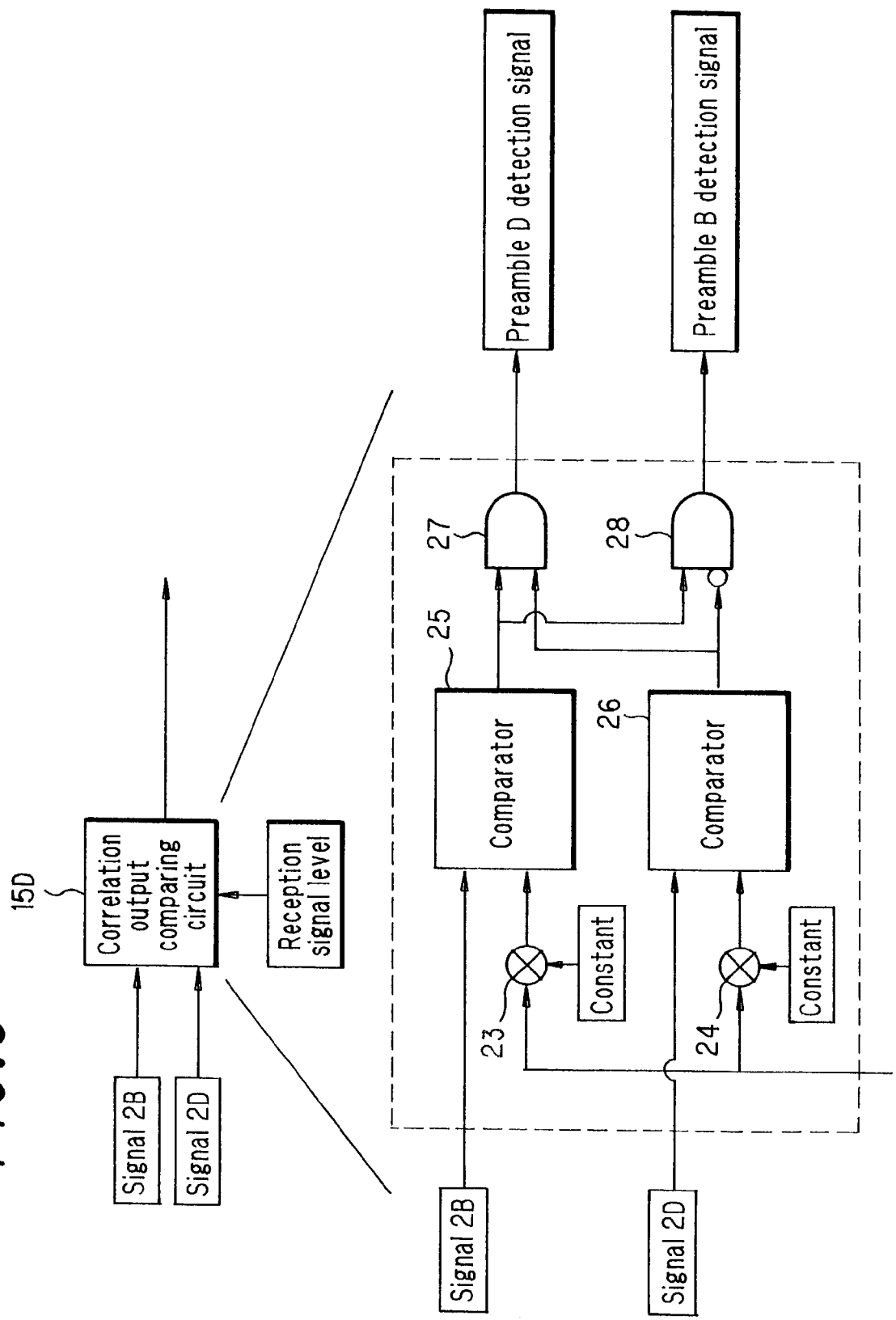
FIG. 9 is a block diagram showing one constructional example of a correlation output comparing circuit capable of identifying preambles B and D in the first embodiment of the present invention.

Referring next to FIG. 9, one constructional example of correlation output comparator 15D will be described. This correlation output comparator 15D is comprised of multipliers 23 and 24 for multiplying the reception signal level by a constant, a comparator 25 for comparing signal 2B with the product of the reception signal level and the constant, a comparator 26 for comparing signal 2D with the product of the reception signal level and the constant, an AND circuit 27 for implementing an AND operation (logical product) between the outputs from comparators 25 and 26, and an AND circuit 28 for implementing an AND operation between the output from comparator 25 and the inversion (negative, reversal) of the output from comparator 26.

With this configuration, reception of preamble D produces a 1 as the preamble D detection signal while reception of preamble B produces a 1 as the preamble B detection signal.

Since there are also methods of identifying the preambles by making comparison between signals 2B and 2D instead of comparing signals 2B and 2D with the reception signal level, the circuit configuration should not be limited to the above. Each of comparators 25 and 26 in FIG. 9 outputs a 1 when corresponding signal 2B or 2D is greater than the product of the reception signal level and the constant.

Figure 10:
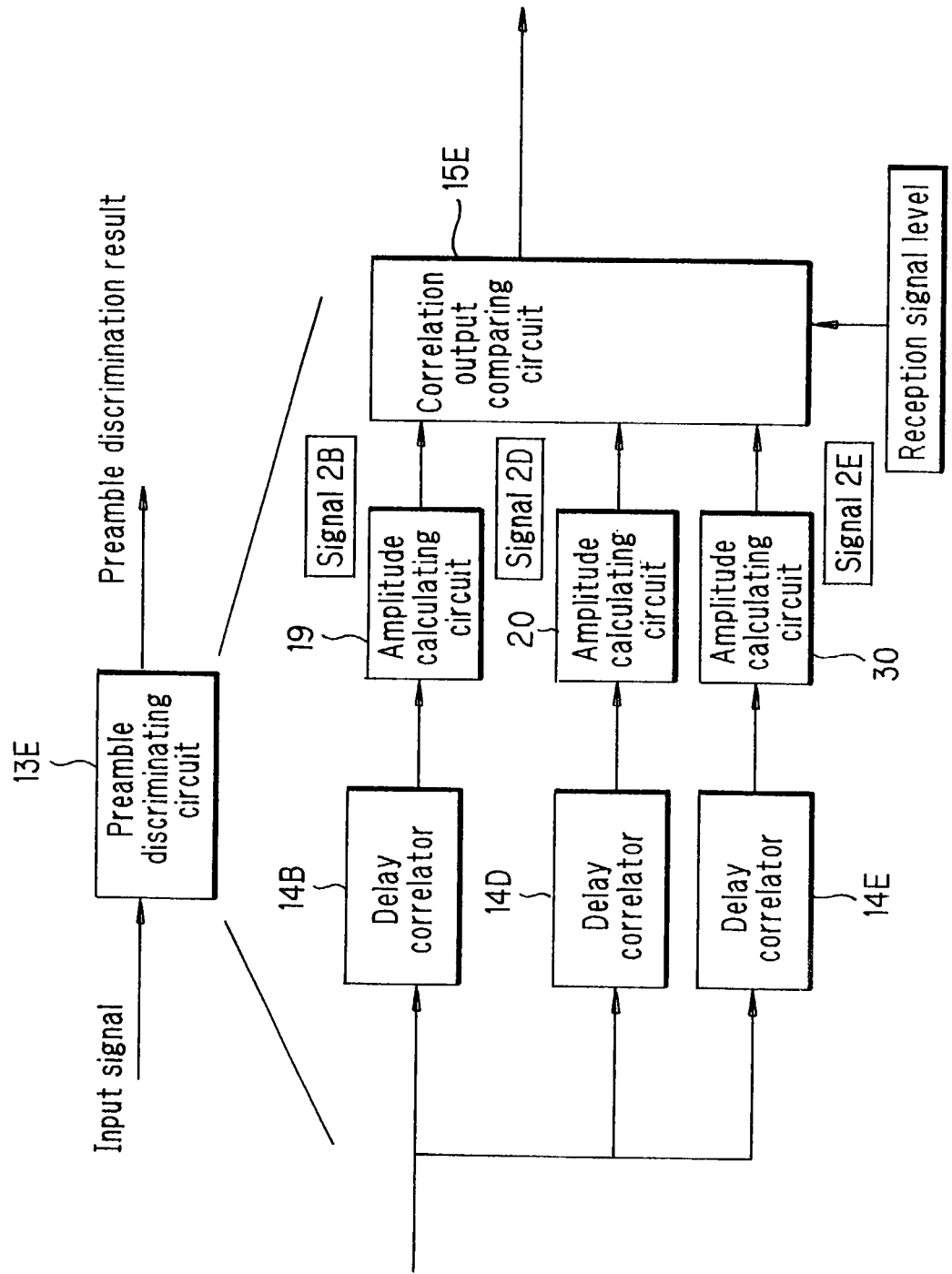
FIG. 10 is a block diagram showing one constructional example of a preamble discriminating circuit capable of identifying preambles B, D and E in the first embodiment of the present invention.

Referring next to FIG. 10, description will be made of one constructional example of a preamble discriminating circuit 13E when three kinds of preambles B, D and E having periods of Tw/4, Tw/8 and Tw/16, respectively, are used for different systems.

Preamble discriminating circuit 13E is comprised of delay correlators 14B, 14D and 14E (14B and 14D are the same as above), each of which calculates the correlation value between the received signal and the delayed signal by the associated delay line having the tap number Ntap set at Tw/4, Tw/8 or Tw/16, amplitude calculating circuits 19, 20 and 30 for calculating the amplitudes of the outputs from delay correlators 14B, 14D and 14E, and a correlation output comparing circuit 15E for discriminating between the preambles based on the outputs from amplitude calculating circuits 19, 20 and 30.

Figure 11:
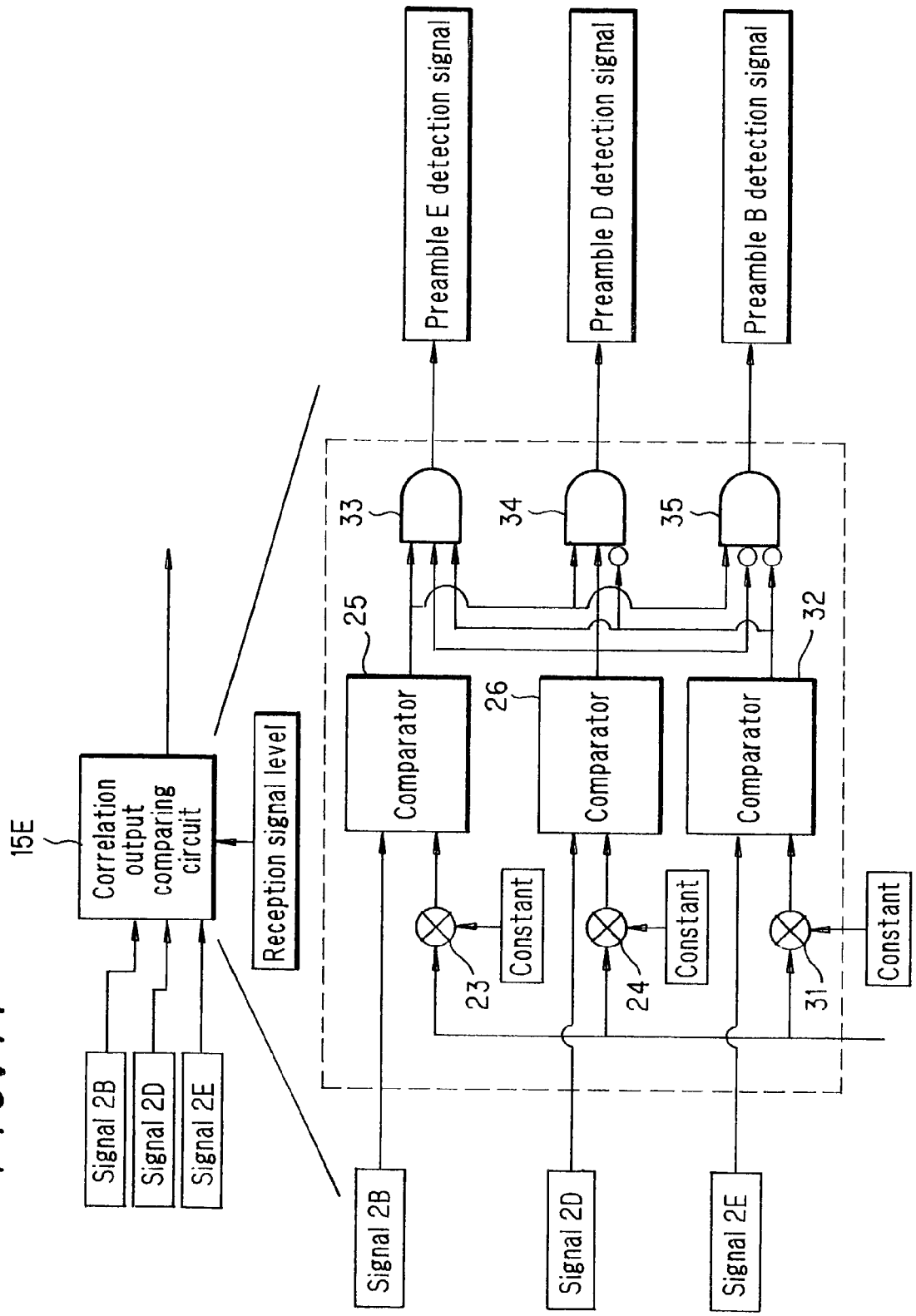
FIG. 11 is a block diagram showing one constructional example of a correlation output comparing circuit capable of identifying preambles B, D and E in the first embodiment of the present invention.

Referring next to FIG. 11, the configuration of correlation output comparing circuit 15E for discriminating between the preambles of three input signals 2B, 2D and 2E will be described.

Correlation output comparing circuit 15E is comprised of multipliers 23, 24 and 31 for multiplying the reception signal level by a constant, a comparator 25 for comparing signal 2B with the product of the reception signal level and the constant, a comparator 26 for comparing signal 2D with the product of the reception signal level and the constant, a comparator 32 for comparing signal 2E with the product of the reception signal level and the constant, an AND circuit 33 for implementing an AND operation of the outputs from comparators 25 26 and 32, an AND circuit 34 for implementing an AND operation of the outputs from comparators 25 and 26 and the inversion of the output from comparator 32 and an AND circuit 35 for implementing an AND operation of the outputs from comparator 25 and the inversions of the outputs from comparators 26 and 32.

The above description has been made referring to cases where preambles having two or three kinds of periods, Tw/N, are used. However, it is obvious that determination of each preamble (system identification) can be carried out when preambles having four or more kinds of periods, Tw/N, are employed. Further, the present embodiment should not be limited to transmitter-receivers based on OFDM signals.

THE SECOND EMBODIMENT

Next, the second embodiment of the present invention will be described with reference to FIGS. 12 to 14. Here, the same components as in the first embodiment of the present invention are allotted with the same reference numerals and description is omitted.

The transmitter of the present embodiment is different from the first embodiment, described above with reference to FIG. 2, in the preamble signal stored in memory 7 only, so that this preamble signal will be described below.

Figure 12:
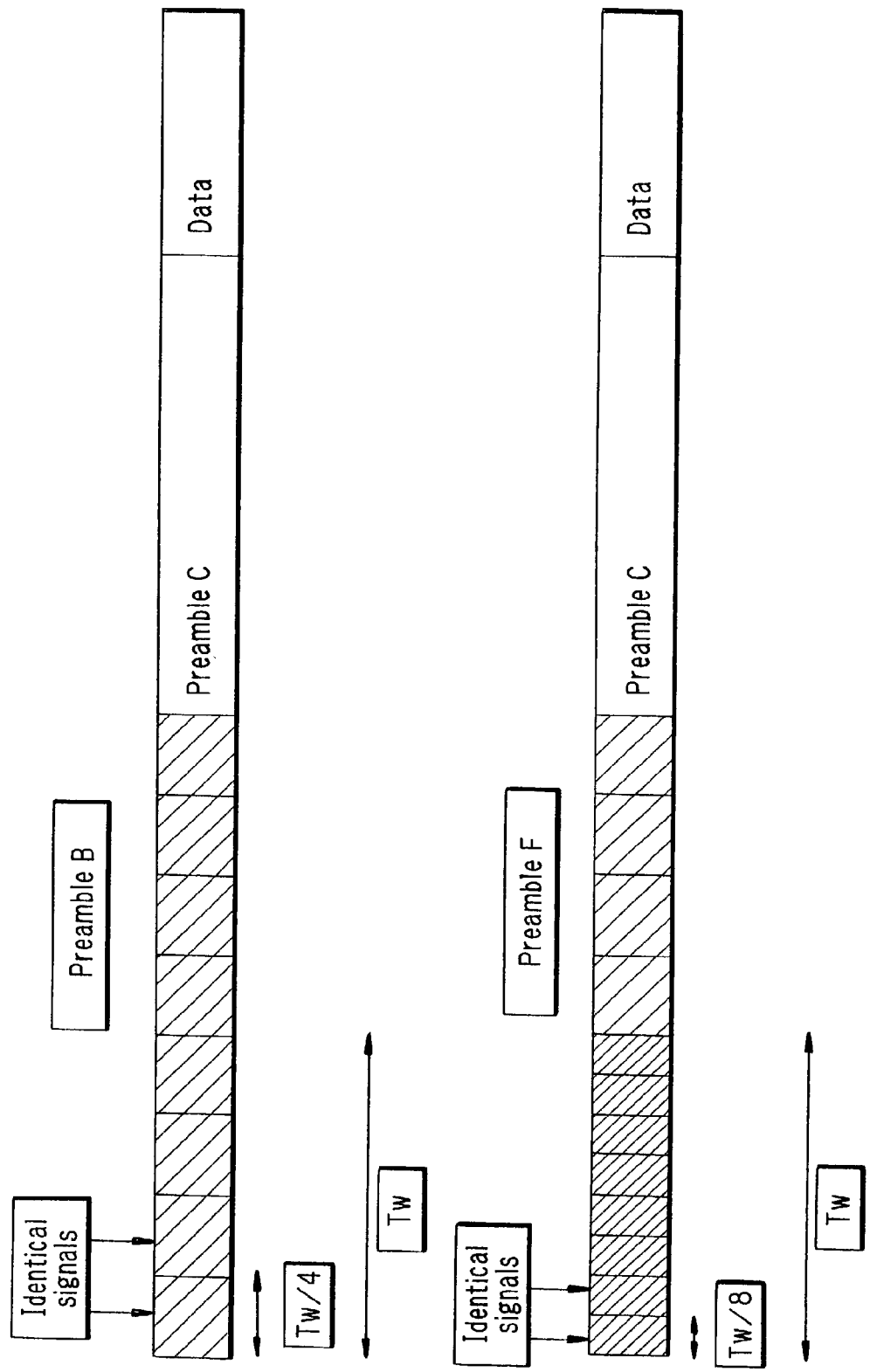
FIG. 12 is an illustrative view showing signals containing two types of preambles (preambles B and E) used in the second embodiment of the present invention.

Here, as shown in FIG. 12, the preamble B of a signal having a period of Tw/4 shown in the first embodiment and a signal, of which part of preamble B is modified to have a period of Tw/8 (containing two different periods, Tw/8 and Tw/4) called preamble F are used.

The receiver of the present embodiment is different from the first embodiment, described above with reference to FIGS. 4 and 5, only in that the correlation output comparing circuit 15D is replaced by a correlation output comparing circuit 15F capable of identifying preamble F, so this correlation output comparing circuit 15F will be described.

Figure 13:
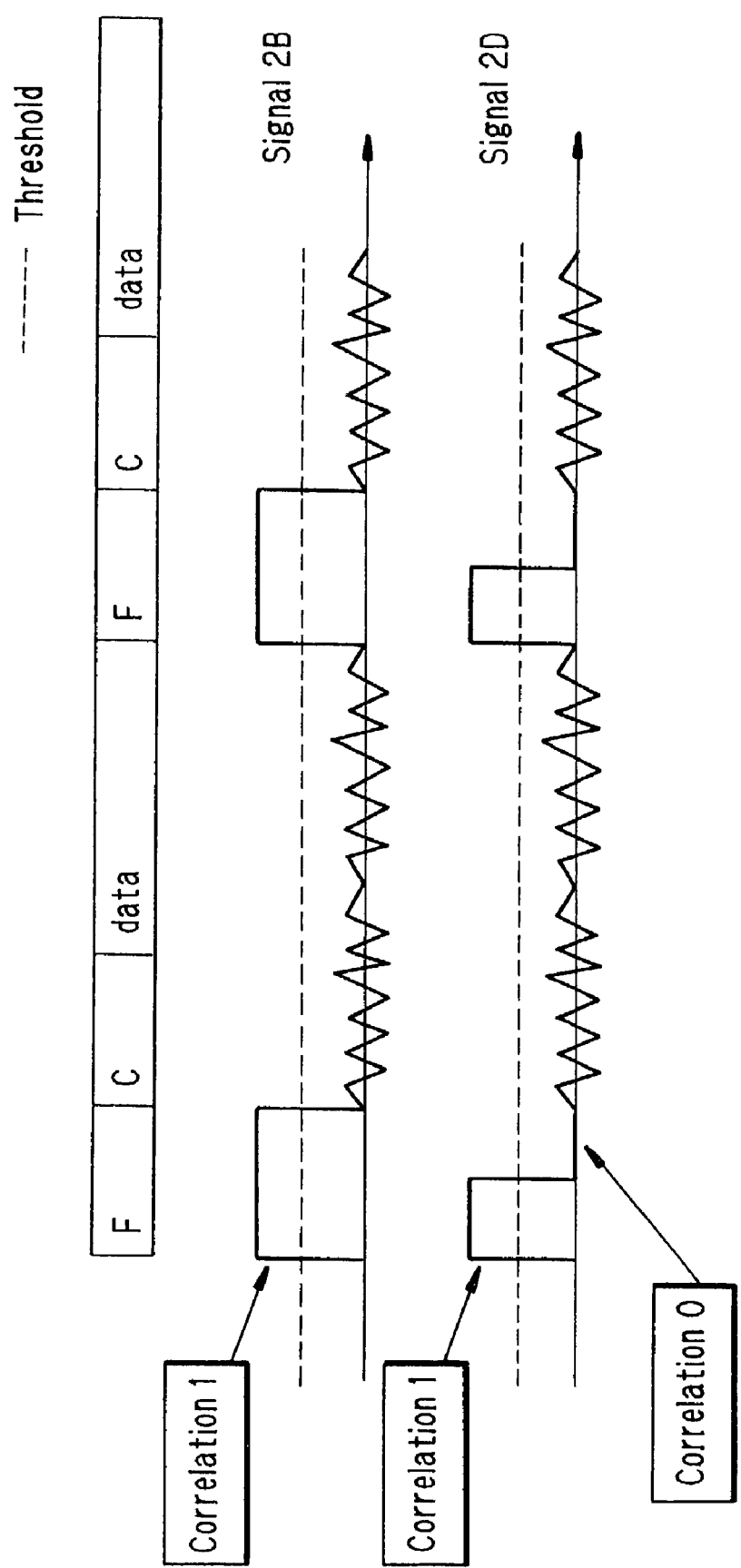
FIG. 13 is an illustrative view showing a delay correlator output (amplitude value) when a preamble F is received in the second embodiment of the present invention.

FIG. 13 shows the amplitudes of the outputs (signals 2B and 2D) from delay correlator 14D (calculation of the correlation value between the received signal and a delayed signal of the received signal by Tw/8) when received signals contain preambles B and F.

In the first embodiment, when preamble B is received, signal 2B presents 1 as a correlation value and signal 2D presents 0 as a correlation value, as shown in FIG. 7. In contrast, it is understood in this embodiment from FIG. 13 that, when preamble F is received, signal 2B presents 1 as a correlation value and signal 2D presents a correlation value of 1, during the first half of preamble F and presents a correlation value of 0 in the second half.

Accordingly, in the present embodiment, use of preamble F realizes its easy distinction from preamble B. Here, the correlation value used herein is one which is normalized based on the power of the received signal.

Figure 14:
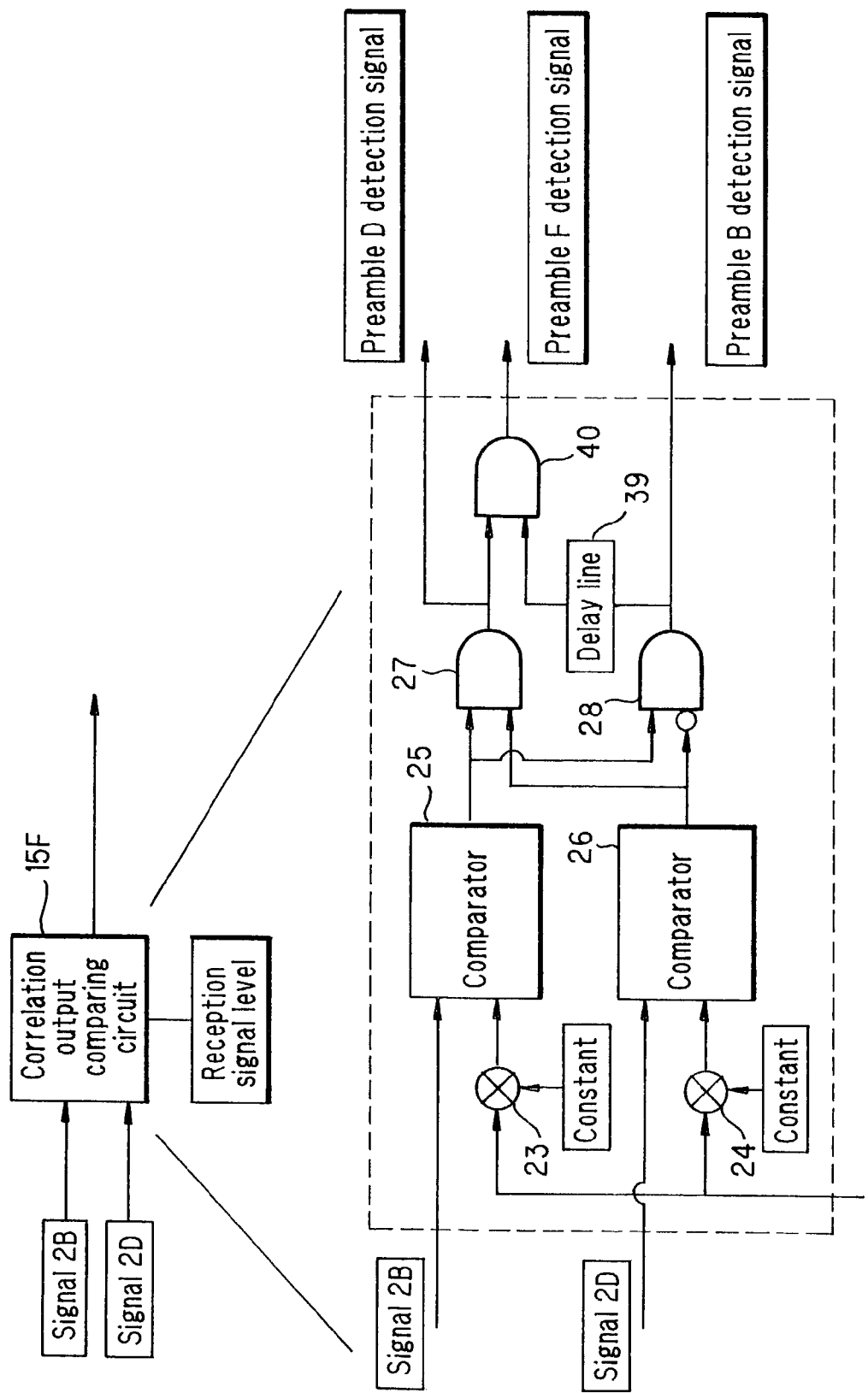
FIG. 14 is a block diagram showing one constructional example of a correlation output comparing circuit capable of identifying preambles B, D and F in the second embodiment of the present invention.

Referring next to FIG. 14, one constructional example of correlation output comparator 15F will be described. This correlation output comparator 15F is comprised of multipliers 23 and 24 for multiplying the reception signal level by a constant, a comparator 25 for comparing signal 2B with the product of the reception signal level and the constant, a comparator 26 for comparing signal 2D with the product of the reception signal level and the constant, an AND circuit 27 for implementing an AND operation between the outputs from comparators 25 and 26, an AND circuit 28 for implementing an AND operation between the output from comparator 25 and the inversion of the output from comparator 26 and an AND circuit 40 for implementing an AND operation between the output from AND circuit 27 and a delayed signal of the output from AND circuit 28.

With this configuration, reception of preamble D produces a 1 as the preamble D detection signal while reception of preamble B produces a 1 as the preamble B detection signal and detection of preamble F produces a 1 as the preamble F detection signal.

It should be noted that the circuit configuration shown in FIG. 14 is to deal with preambles D and F shown in FIG. 12. The circuit configuration may change for different preambles, hence should not be limited to this. Also, the present embodiment should not be limited to transmitter-receivers based on OFDM signals.

THE THIRD EMBODIMENT

Next, the third embodiment of the present invention will be described with reference to FIGS. 15 to 24, and FIGS. 19 and 20. Here, the same components as in the first and second embodiments of the present invention are allotted with the same reference numerals and description is omitted.

The transmitter of the present embodiment is different from the first embodiment, described above with reference to FIG. 2, in the preamble signal stored in memory 7 only, so that this preamble signal will be described below.

Figure 15:
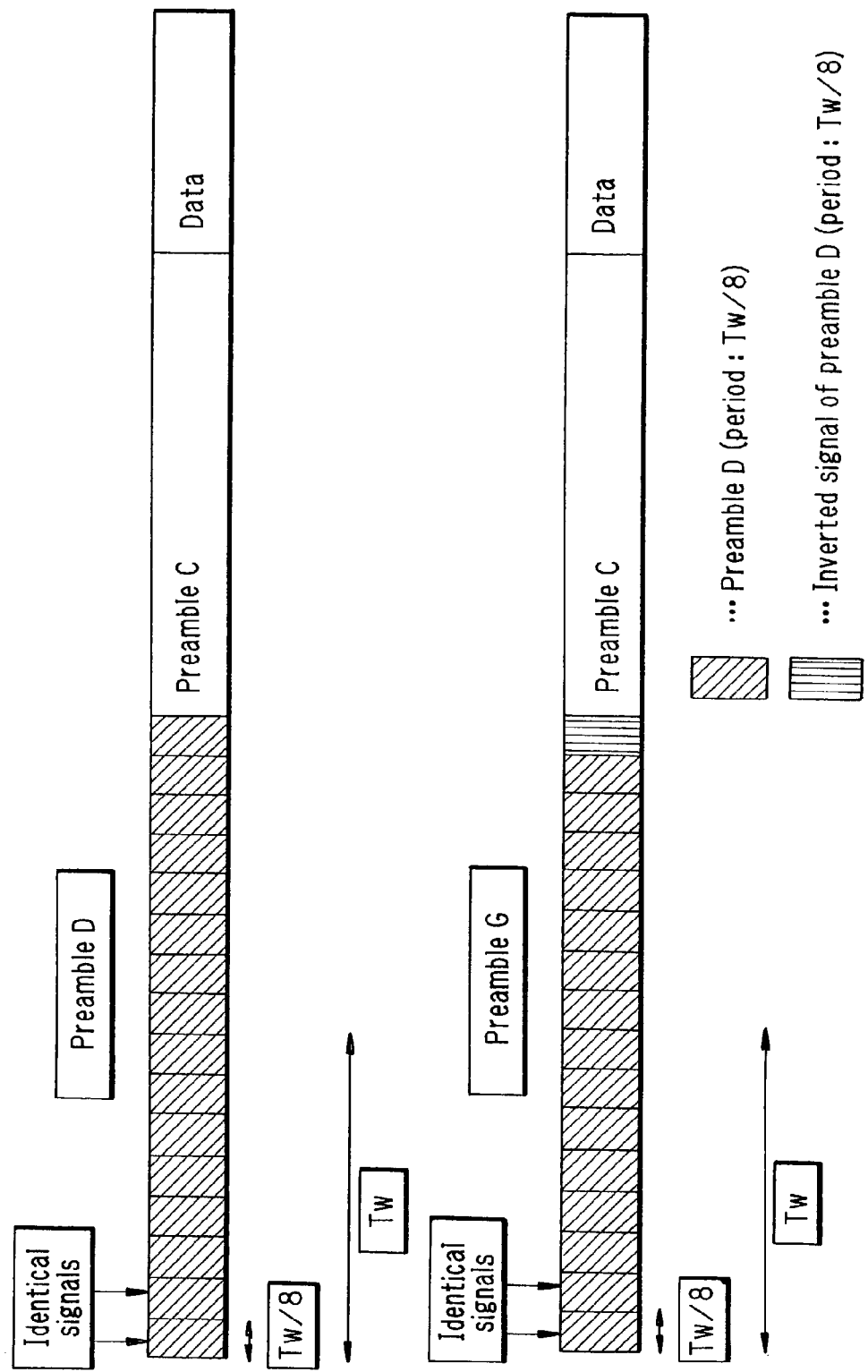
FIG. 15 is an illustrative view showing signals containing two types of preambles (preambles D and G) used in the third embodiment of the present invention.

Here, as shown in FIG. 15, the signal having a period of Tw/8 shown in the first embodiment is used as preamble D and another signal, which is the same as preamble D except having its part inverted (positive values made negative and vice-versa, along the time axis) is used as a preamble G. Here, the positions where the signal values are inverted in the preamble and its period should not be limited to this example.

The receiver of the present embodiment is different from the first embodiment, described above with reference to FIG. 4, only in that the preamble discriminating circuit 13D is replaced by a preamble discriminating circuit 13G capable of identifying preamble G, so this preamble discriminating circuit 13G will be described below.

Figure 16:
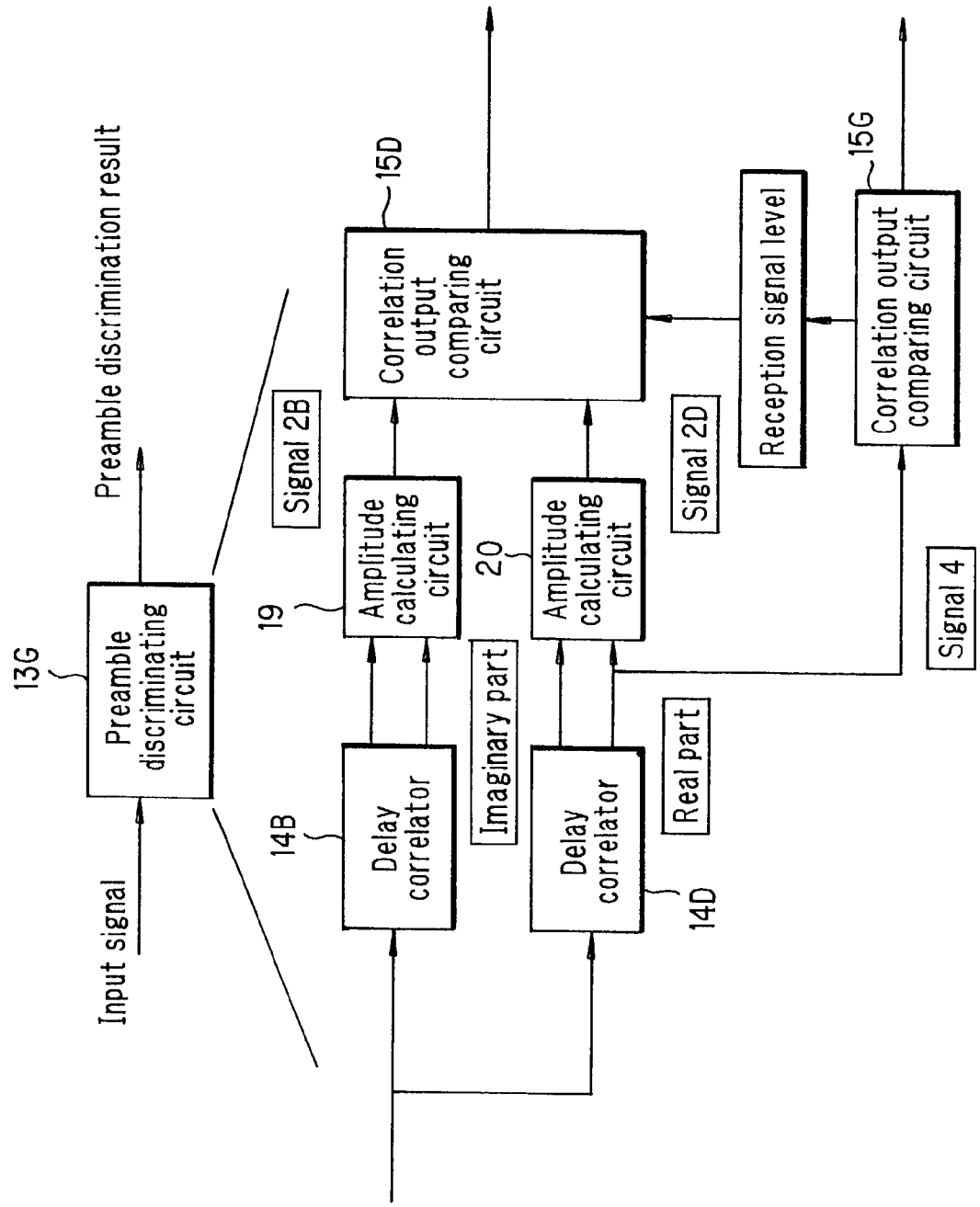
FIG. 16 is a block diagram showing one constructional example of a preamble discriminating circuit capable of identifying preambles D and G in the third embodiment of the present invention.

Preamble discriminating circuit 13G is comprised, as shown in FIG. 16, of delay correlators 14B and 14D for computing the correlation value between the received signal and a delayed signal of the received signal by Tw/N (Tw: symbol length, N: an integer equal to 1 or greater), amplitude calculating circuits 19 and 20 for calculating the amplitudes of the outputs from delay correlators 14B and 14D, a correlation output comparing circuit 15D for implementing preamble discrimination (system identification) by comparing the outputs from amplitude calculating circuits 19 and 20 with a threshold determined based on the reception signal level, and a correlation output circuit 15G for implementing preamble discrimination (system identification) by comparing the real part of the output from delay correlator 14D with a threshold determined based on the reception signal level.

Figure 17:
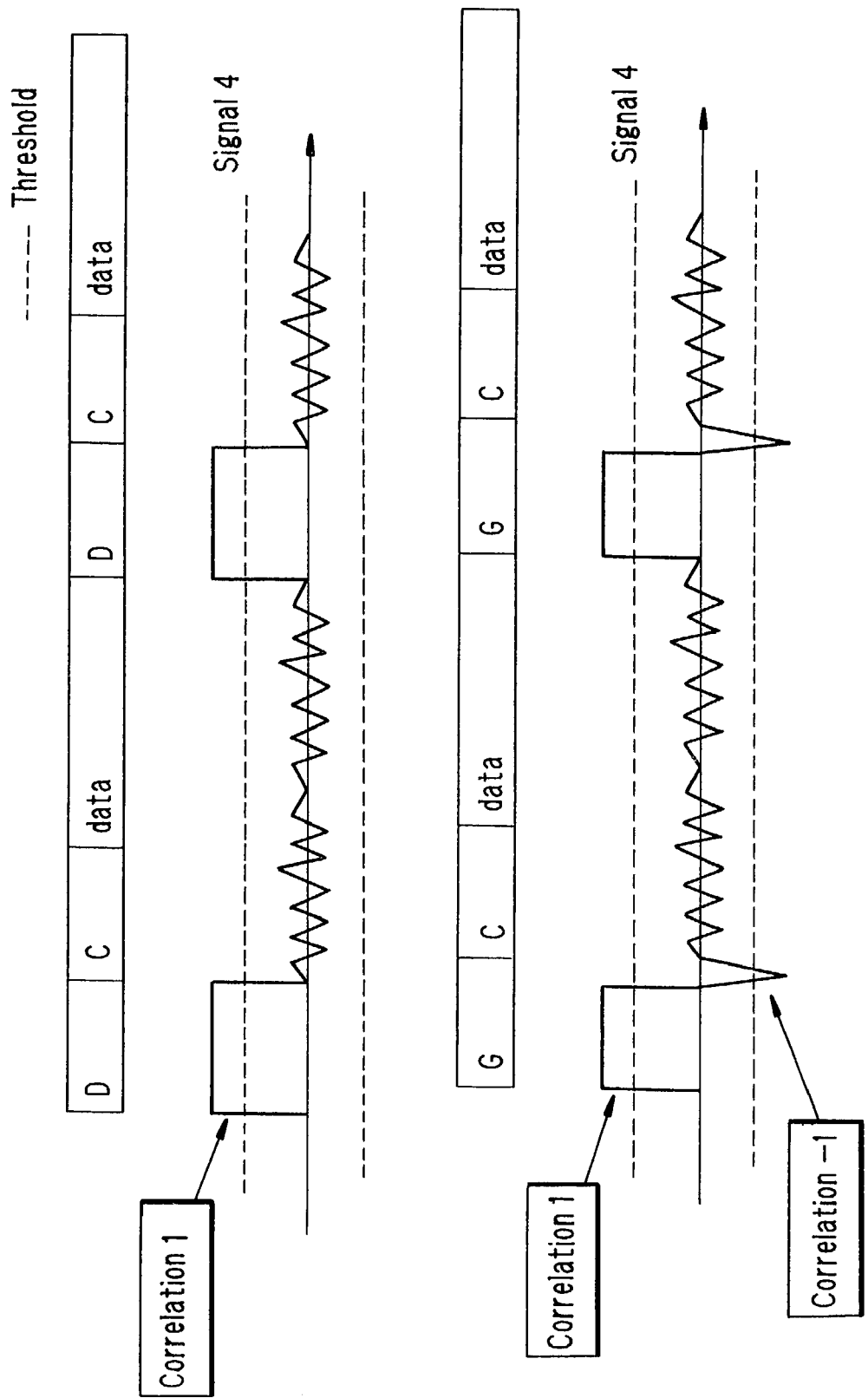
FIG. 17 is an illustrative view showing delay correlator outputs (real part outputs) when preambles D and G are received in the third embodiment of the present invention.

FIG. 17 shows the real part of the output (a signal 4) from delay correlator 14D (the calculation of the correlation value between the received signal and a delayed signal of the received signal by Tw/8) when a signal containing preamble D or G is received.

When preamble D is received, signal 4 presents a correlation value of 1, whereas, when preamble G is received, signal 4 presents a correlation value of −1 during the section in which the signal value is inverted. Here, the correlation value used herein is one which is normalized based on the power of the received signal.

Figure 18:
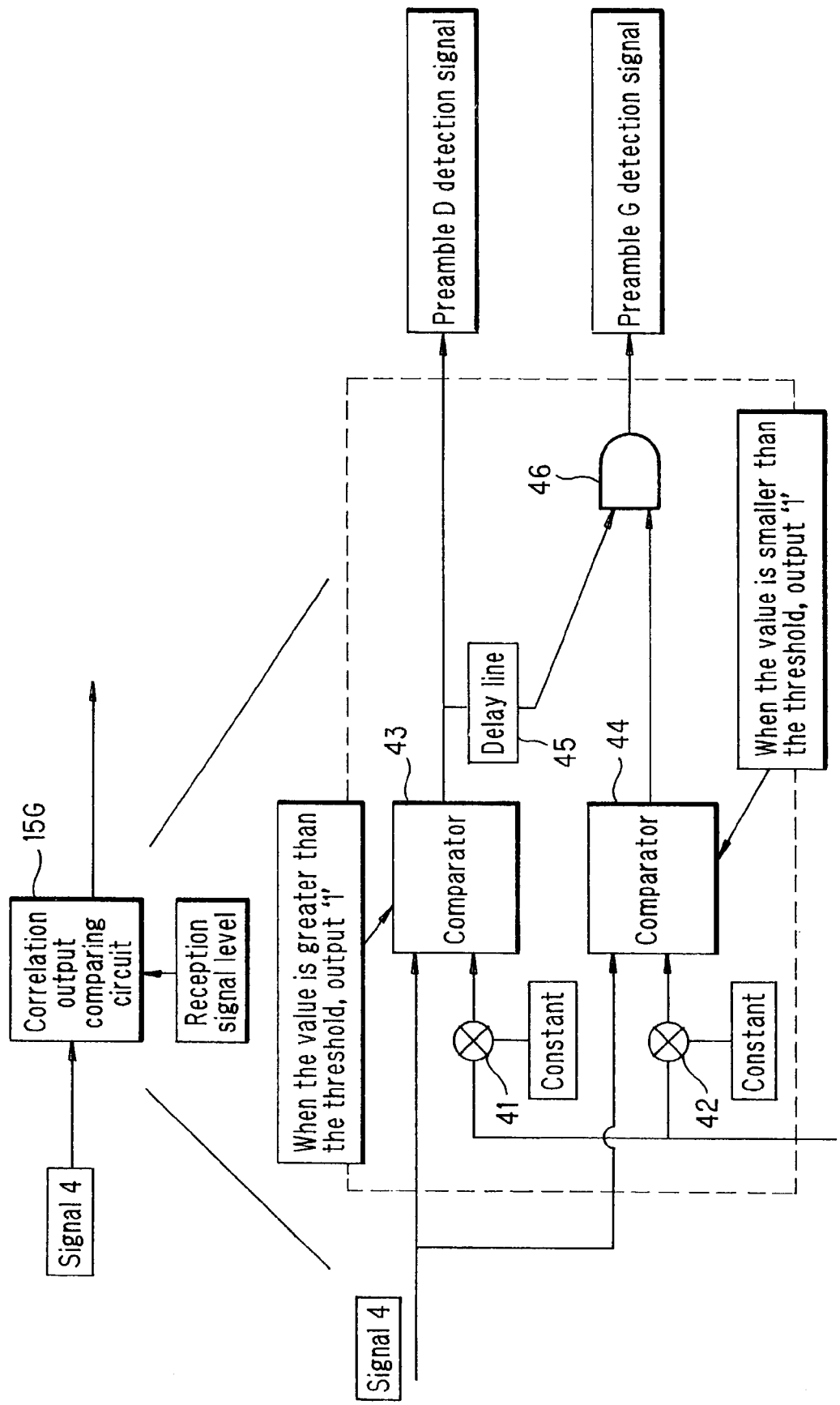
FIG. 18 is a block diagram showing one constructional example of a correlation output comparing circuit capable of identifying preambles D and G in the third embodiment of the present invention.

Referring next to FIG. 18, one constructional example of correlation output comparator 15G will be described. This correlation output comparator 15G is comprised of multipliers 41 and 42 for multiplying the reception signal level by a constant, a comparator 43 for comparing signal 4 with the product of the reception signal level and a constant (positive number), a comparator 44 for comparing signal 4 with the product of the reception signal level and a constant (negative number), an AND circuit 46 for implementing an AND operation between a delayed signal of the output from comparator 43 and the output from comparator 44.

With this configuration, reception of preamble D produces a 1 as the preamble D detection signal while reception of preamble G produces a 1 as the preamble G detection signal. Accordingly, in the present embodiment, use of preamble G realizes its easy distinction from preamble D.

Figure 19:
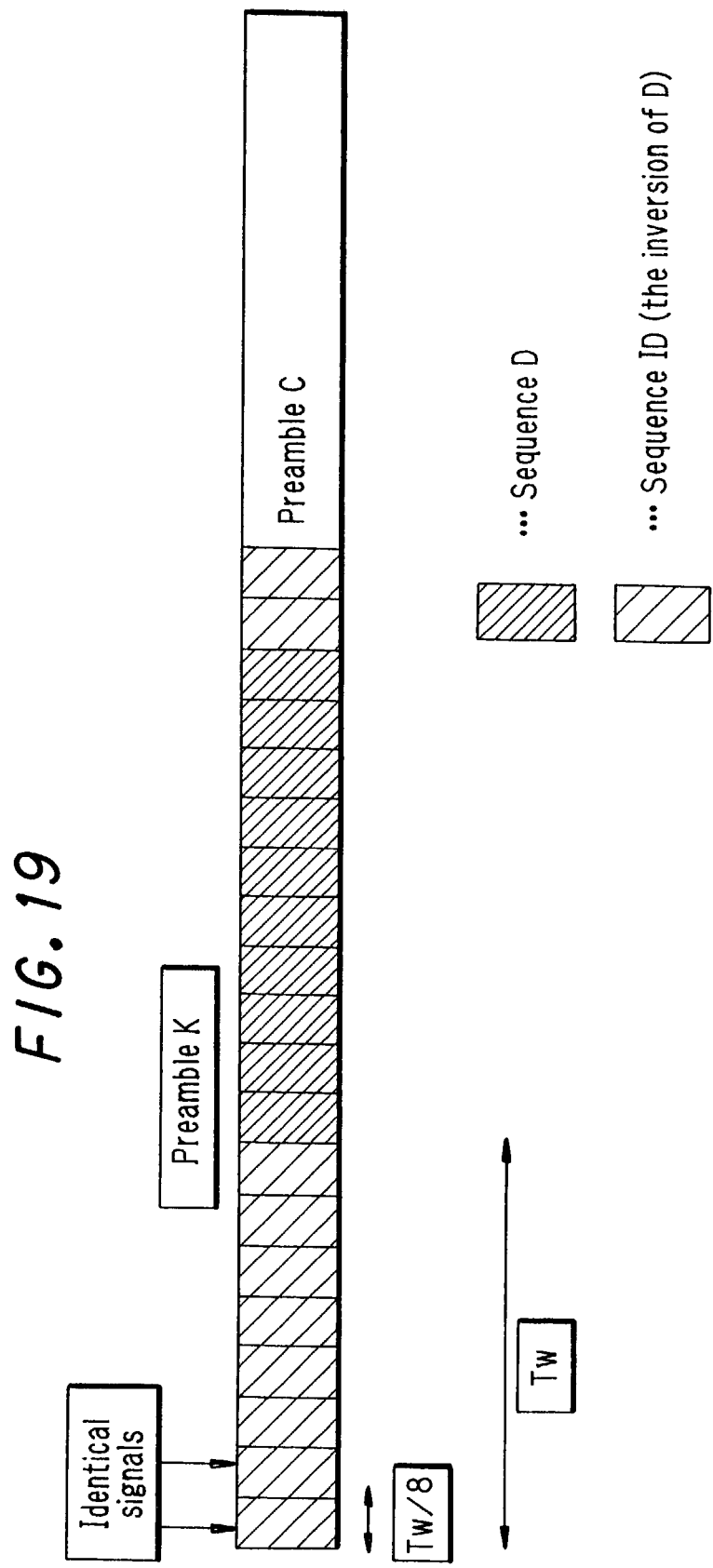
FIG. 19 is an illustrative view showing a preamble (K) sequence used in the third embodiment of the present invention.

Next, as a variational example of preamble G, a preamble K shown in FIG. 19 will be discussed.

The signal having a period of Tw/8 shown in the first embodiment is used as preamble D and another signal, which is modified from preamble D by having values of the eight periods in the front half inverted (positive values made negative and vice-versa, along the time axis) and the two periods, after skipping over ten more periods, inverted, is used as a preamble K.

The configuration for handling preamble K is different from that for preamble G, only in the correlation output circuit for implementing preamble discrimination (system identification), so this correlation output circuit 15K will be described next.

Figure 20:
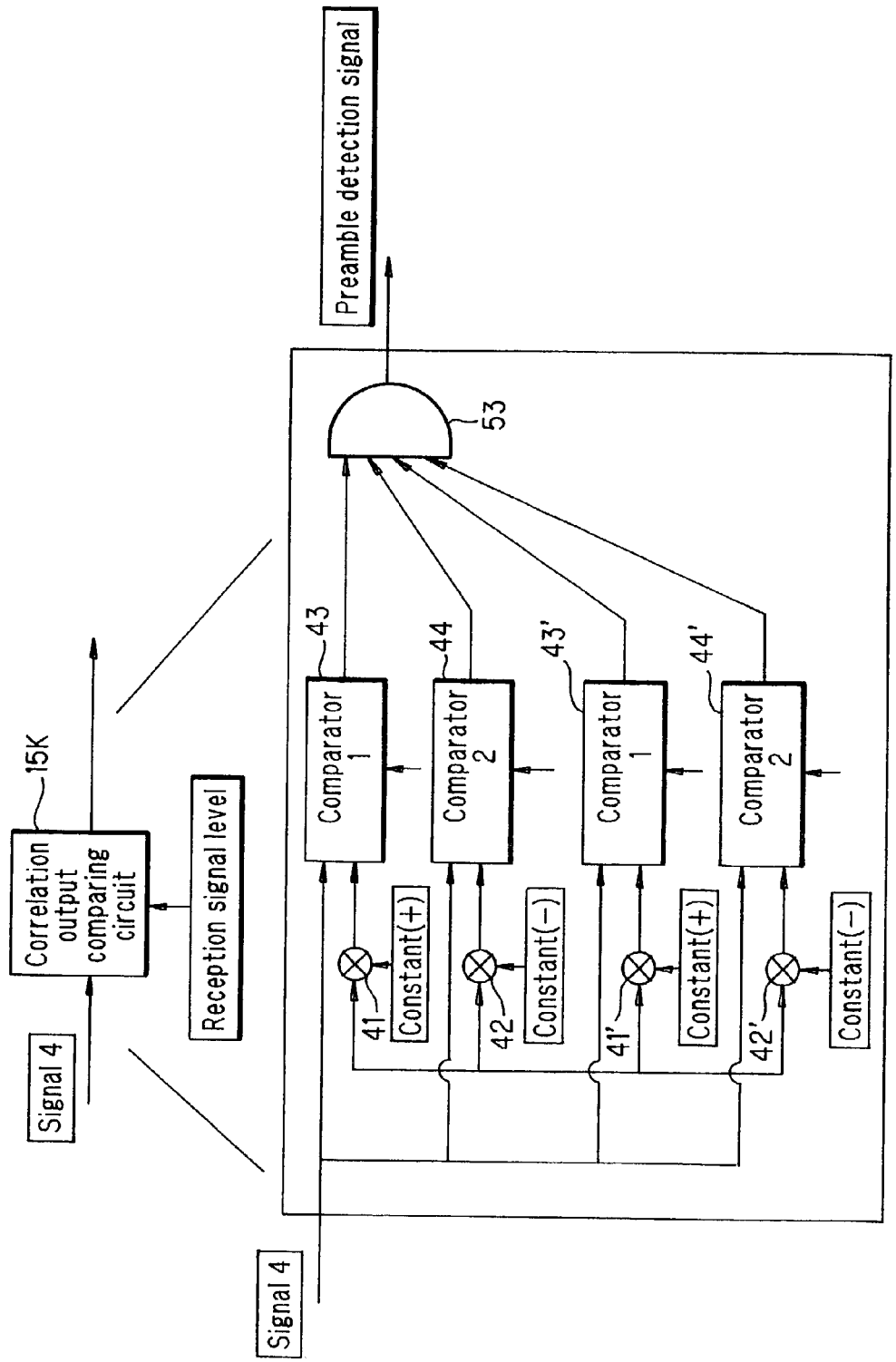
FIG. 20 is a block diagram showing one constructional example of a correlation output comparing circuit capable of determining preamble K in the third embodiment of the present invention.

Referring next to FIG. 20, one constructional example of correlation output comparator 15K will be described. This correlation output comparator 15K is comprised of multipliers 41, 42, 41' and 42' for multiplying the reception signal level by a constant, comparators 43 and 43' for comparing signal 4 with the product of the reception signal level and a constant (positive number), comparators 44 and 44' for comparing signal 4 with the product of the reception signal level and a constant (negative number) and an AND circuit 53 for implementing an AND operation of the output from comparator 43, the output from comparator 44, the output from 43' and the output from 44'.

With this configuration, reception of preamble D produces a 1 as the preamble D detection signal while reception of preamble K produces a 1 as the preamble G detection signal. Accordingly, in the present embodiment, use of preamble K also realizes its easy discrimination from preamble D.

Further, similarly to the first embodiment, described above, use of correlation output comparing circuit 15D shown in FIG. 16 also makes it possible to discriminate between preambles having different periods.

As described above, preambles having periods of Tw/N shown in the first embodiment can also be used so that a greater number of systems can be identified using the method of this embodiment. It should be noted that the present embodiment is not limited to transmitter-receivers based on OFDM signals.

Figure 21:
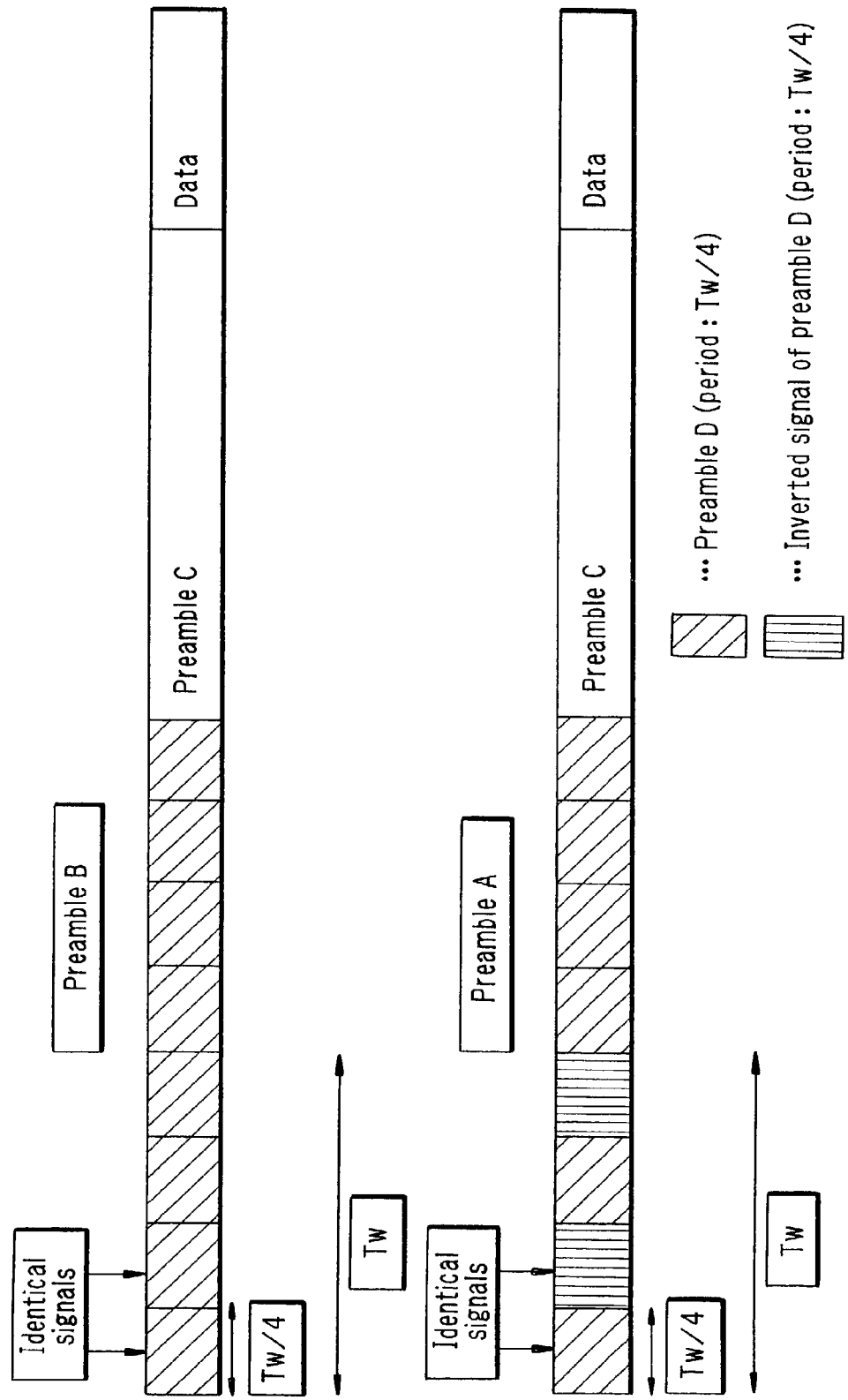
FIG. 21 is an illustrative view showing signals containing two other types of preambles (preambles B and A) used in the third embodiment of the present invention.

The above description was made to referring to a case using preamble H, in which one period of the periodic signal having a period of Tw/8 is inverted, but it is also possible to use a preamble A, which is modified from preamble B having a period of Tw/4 by having the signal values in its front half inverted every other period (the positive values made negative and vice-versa, along the time axis), as shown in FIG. 21.

Application of these preambles A and B to different systems makes it possible to realize easy system identification based on its preamble before implementing synchronization and frequency synchronization.

Figure 22:
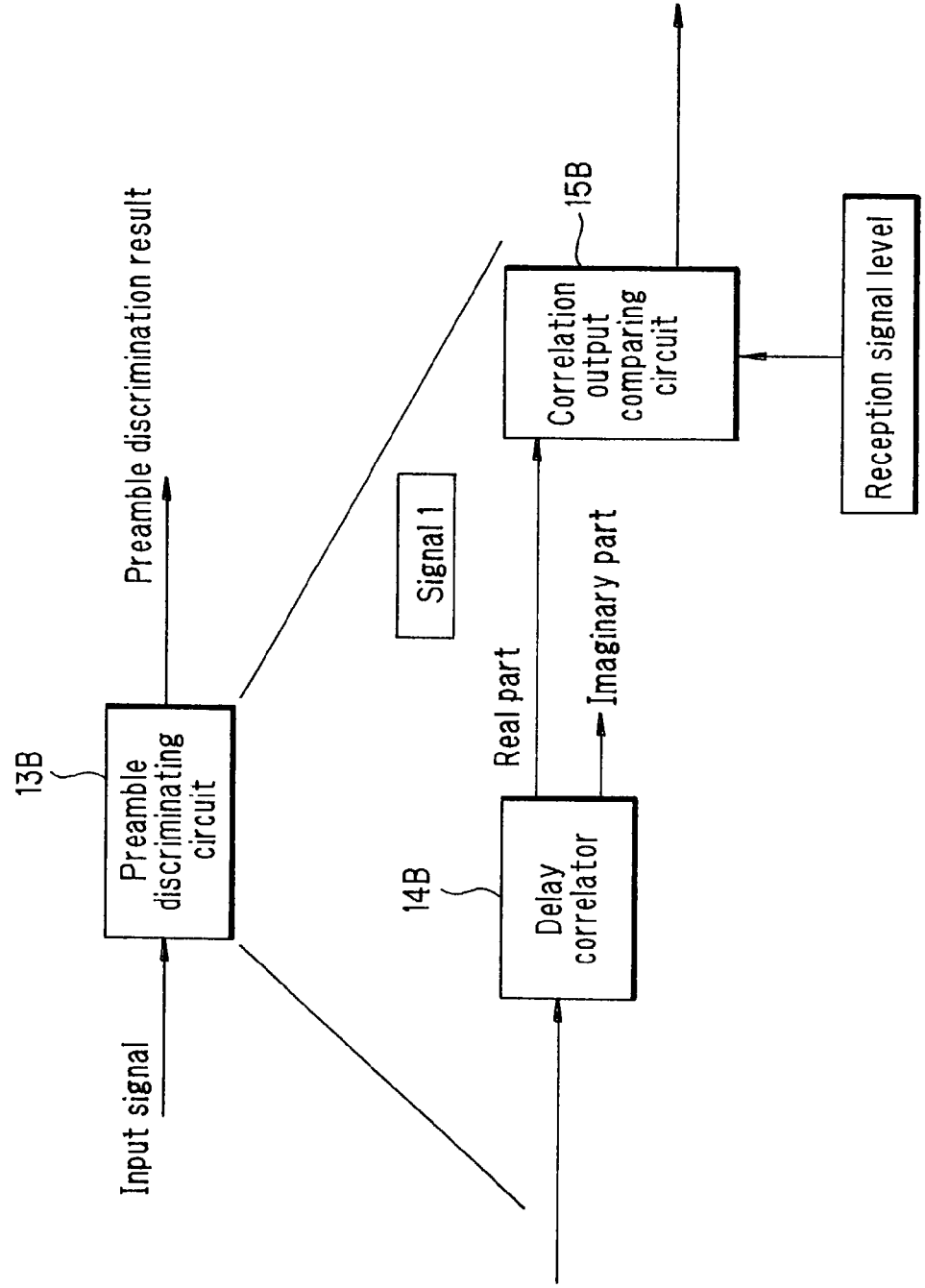
FIG. 22 is a block diagram showing one constructional example of a preamble discriminating circuit capable of identifying preambles B and A in the third embodiment of the present invention.

A preamble discriminating circuit 13B in this case may be configured, as shown in FIG. 22, of a delay correlator 14B for calculating the correlation value between the received signal and a delayed signal of the received signal by Tw/4 (Tw: symbol length) and a correlation output comparing circuit 15B for implementing preamble discrimination (system identification) by comparing the real part of the output from delay correlator 14B with a threshold which is determined based on the reception signal level.

Figure 23:
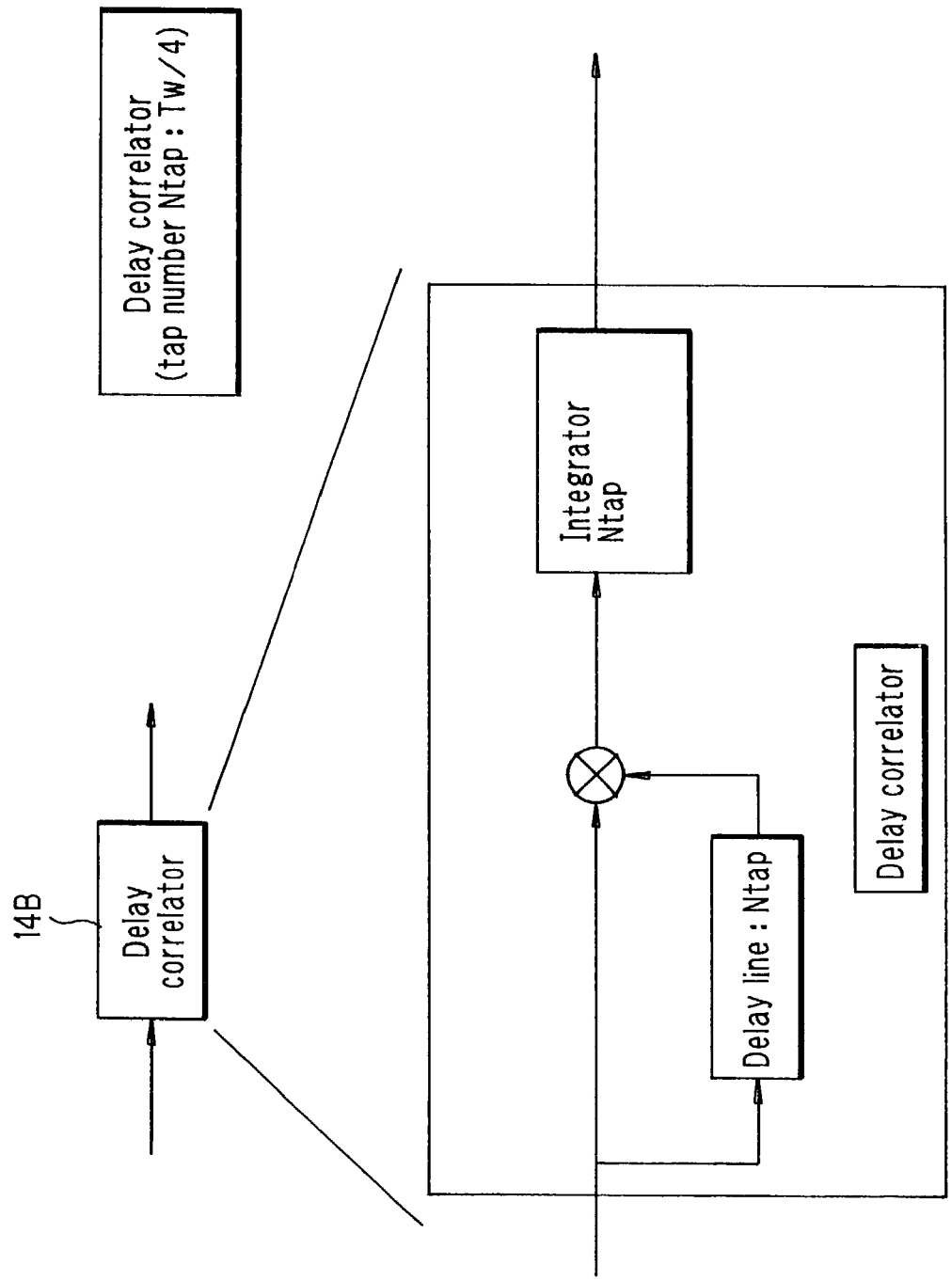
FIG. 23 is a block diagram showing one constructional example of a delay correlator in the third embodiment of the present invention.

Further, the delay correlator 14B in this case should be adapted to output a value which is obtained by adding up the complex multiplication results between the input signal and its delayed signal by an Ntap tap delay line, a predetermined number of times, as shown in FIG. 23.

Figure 24:
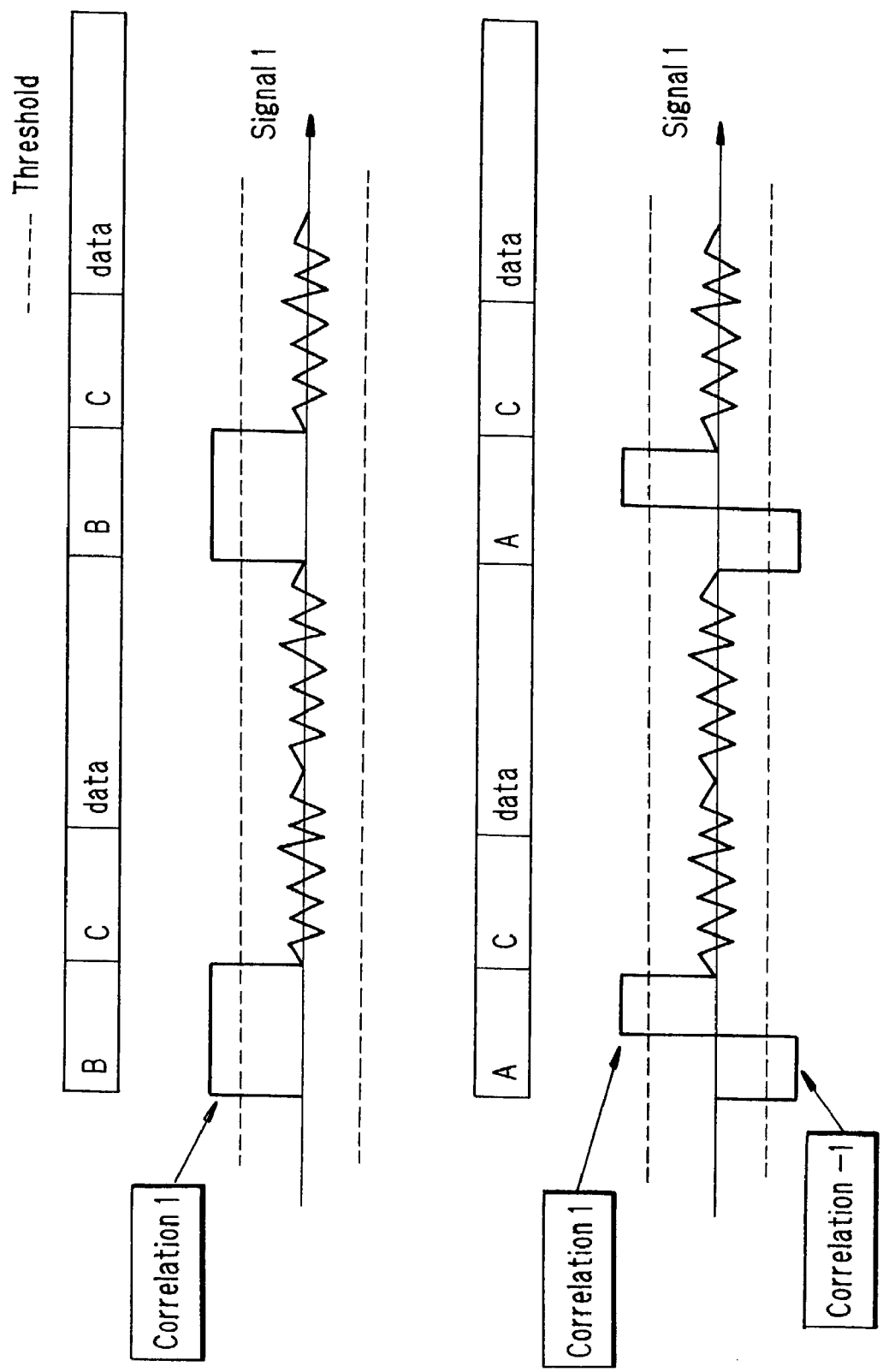
FIG. 24 is an illustrative view showing delay correlator outputs (amplitude values) when preambles B and A are received in the third embodiment of the present invention.

In this case use of delay correlator 14B with Ntap set at Tw/4 makes it possible to realize easy preamble discrimination. Illustratively, as shown in FIG. 24, when a signal containing preamble B is received, a signal 1 (the amplitude of the signal from the delay correlator) presents a correlation value of 1, which exceeds the threshold, as shown in FIG. 24.

In contrast, when a signal containing preamble A is received, signal 1 presents a −1 as a correlation value in the front half and a 1 in the rear half. In this way, it is understood that a preamble (or a system) can be identified without implementing synchronization or any other process. Here, the correlation value used herein is one which is normalized based on the power of the received signal.

THE FOURTH EMBODIMENT

Next, the fourth embodiment of the present invention will be described with reference to FIGS. 25 to 27. Here, the same components as in the first to third embodiments of the present invention are allotted with the same reference numerals and description is omitted.

The transmitter of the present embodiment is different from the first embodiment, described above with reference to FIG. 2, in the preamble signal stored in memory 7 only, so that this preamble signal will be described below.

Figure 25:
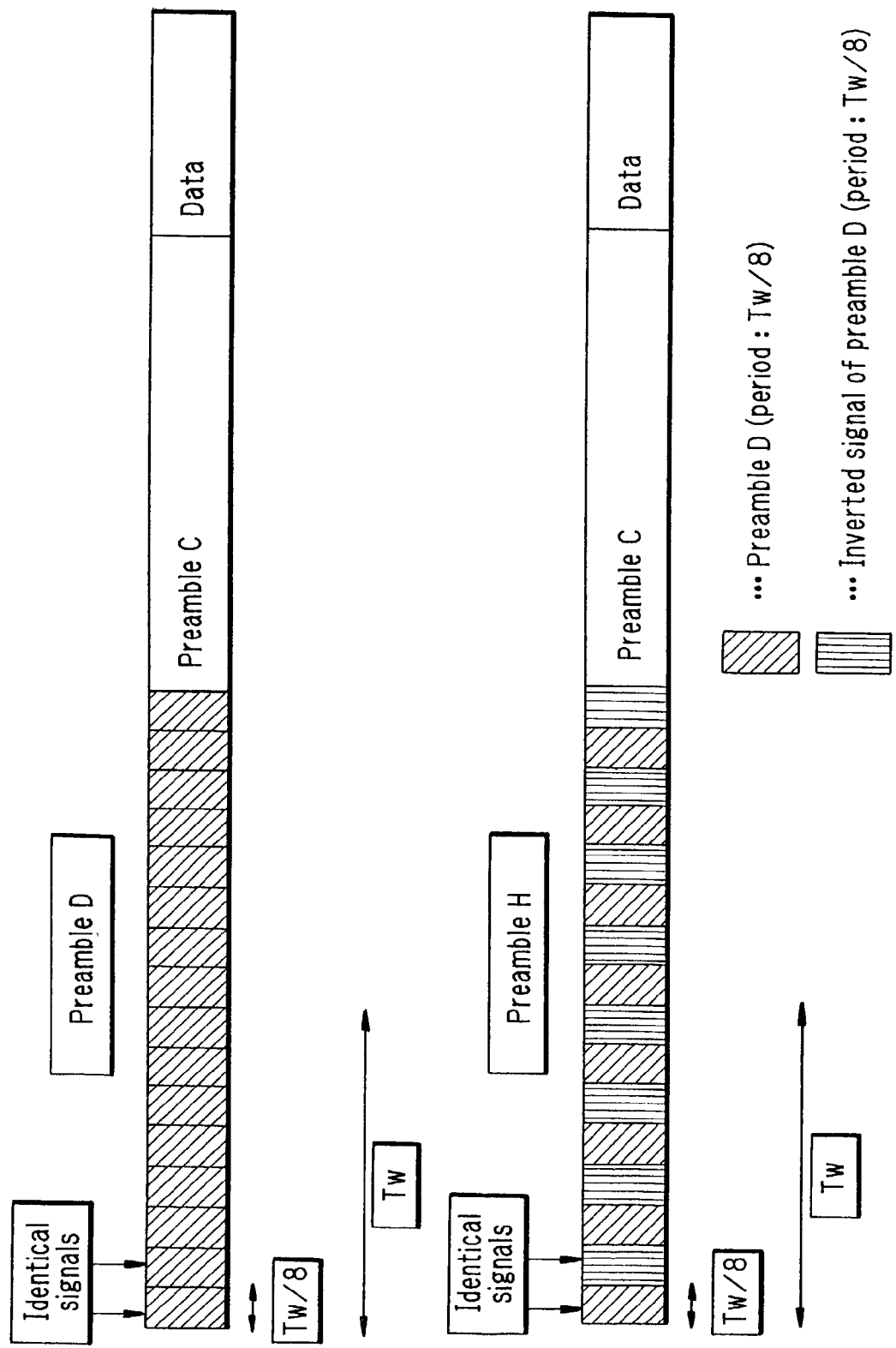
FIG. 25 is an illustrative view showing signals containing two types of preambles (preambles B and H) used in the fourth embodiment of the present invention.

Here, as shown in FIG. 25, the signal having a period of Tw/8 shown in the first embodiment is used as preamble D and another signal sequence, which is modified from preamble D by having signal values inverted every other period (positive values made negative and vice-versa, along the time axis) is used as a preamble H. Here, the period in the preamble should not be limited to this.

The receiver of the present embodiment is different from the third embodiment, described above with reference to FIG. 16, only in that the correlation output comparing circuit 15G is replaced by a correlation output comparing circuit 15H capable of identifying preamble H, so this correlation output comparing circuit 15H will be described.

Figure 26:
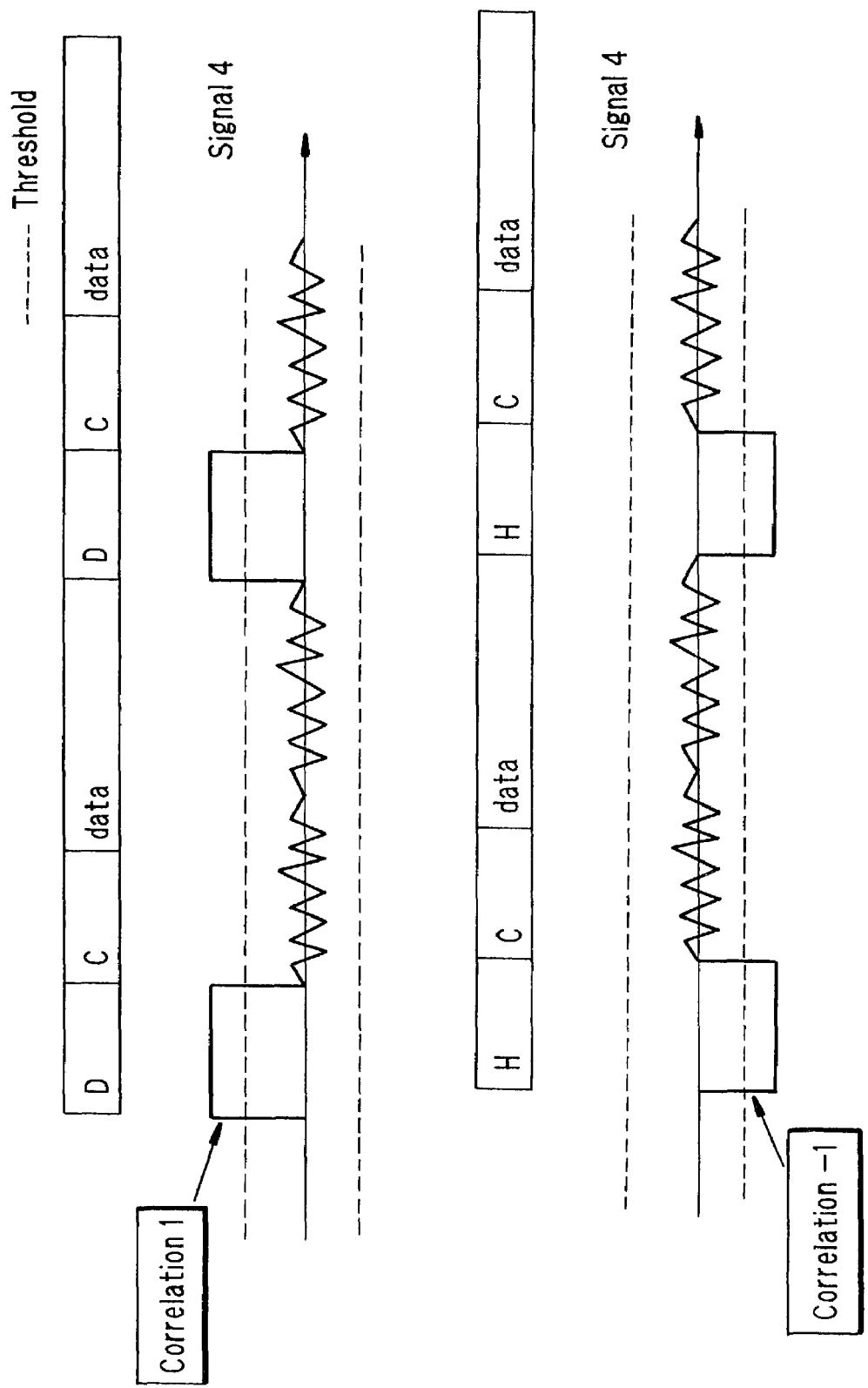
FIG. 26 is an illustrative view showing delay correlator outputs (real part outputs) when preambles D and H are received in the fourth embodiment of the present invention.

FIG. 26 shows the real part of the output (a signal 4) from delay correlator 14D (the calculation of the correlation value between the received signal and a delayed signal of the received signal by Tw/8) when a signal containing preamble D or H is received.

When preamble D is received, signal 4 presents a correlation value of 1, whereas, when preamble H is received, signal 4 presents a correlation value of −1 during the entire section. Here, the correlation value used herein is one which is normalized based on the power of the received signal.

Figure 27:
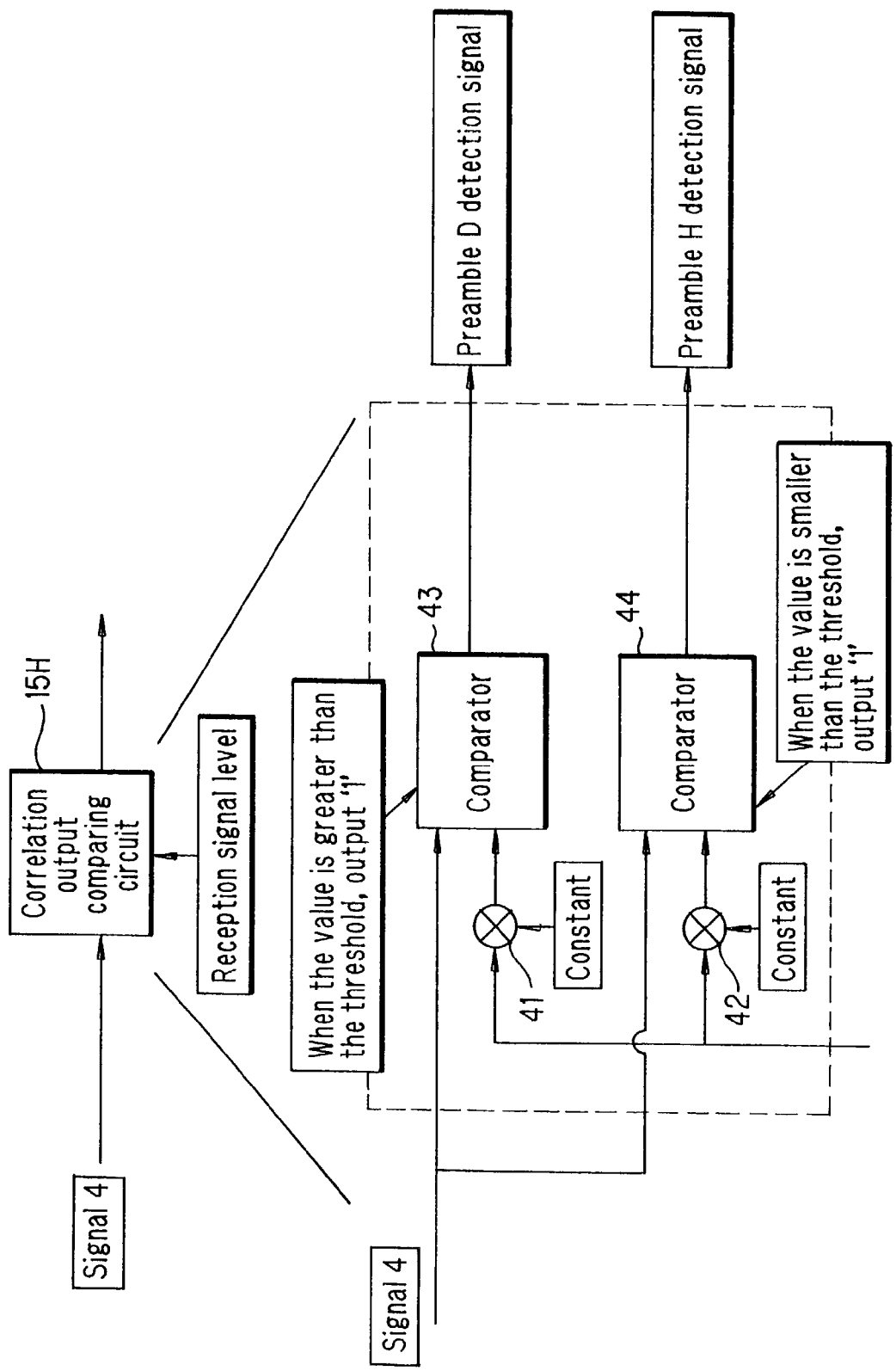
FIG. 27 is a block diagram showing one constructional example of a correlation output comparing circuit capable of identifying preambles D and H in the fourth embodiment of the present invention.

Referring next to FIG. 27, one constructional example of correlation output comparing circuit 15H will be described. This correlation output comparator 15H is comprised of multipliers 41 and 42 for multiplying the reception signal level by a constant, a comparator 43 for comparing signal 4 with the product of the reception signal level and a constant (positive number) and a comparator 44 for comparing signal 4 with the product of the reception signal level and a constant (negative number).

Similarly to the first and third embodiments described above, use of correlation output comparing circuit 15D shown in FIG. 16 also makes it possible to discriminate between preambles having different periods. In this way, the preambles having periods of Tw/N shown in the first embodiment can also be used so that a greater number of systems can be identified using the method of this embodiment.

With this configuration, reception of preamble D produces a 1 as the preamble D detection signal while reception of preamble H produces a 1 as the preamble H detection signal. It should be noted that the present embodiment is not limited to transmitter-receivers based on OFDM signals.

THE FIFTH EMBODIMENT

Figure 28:
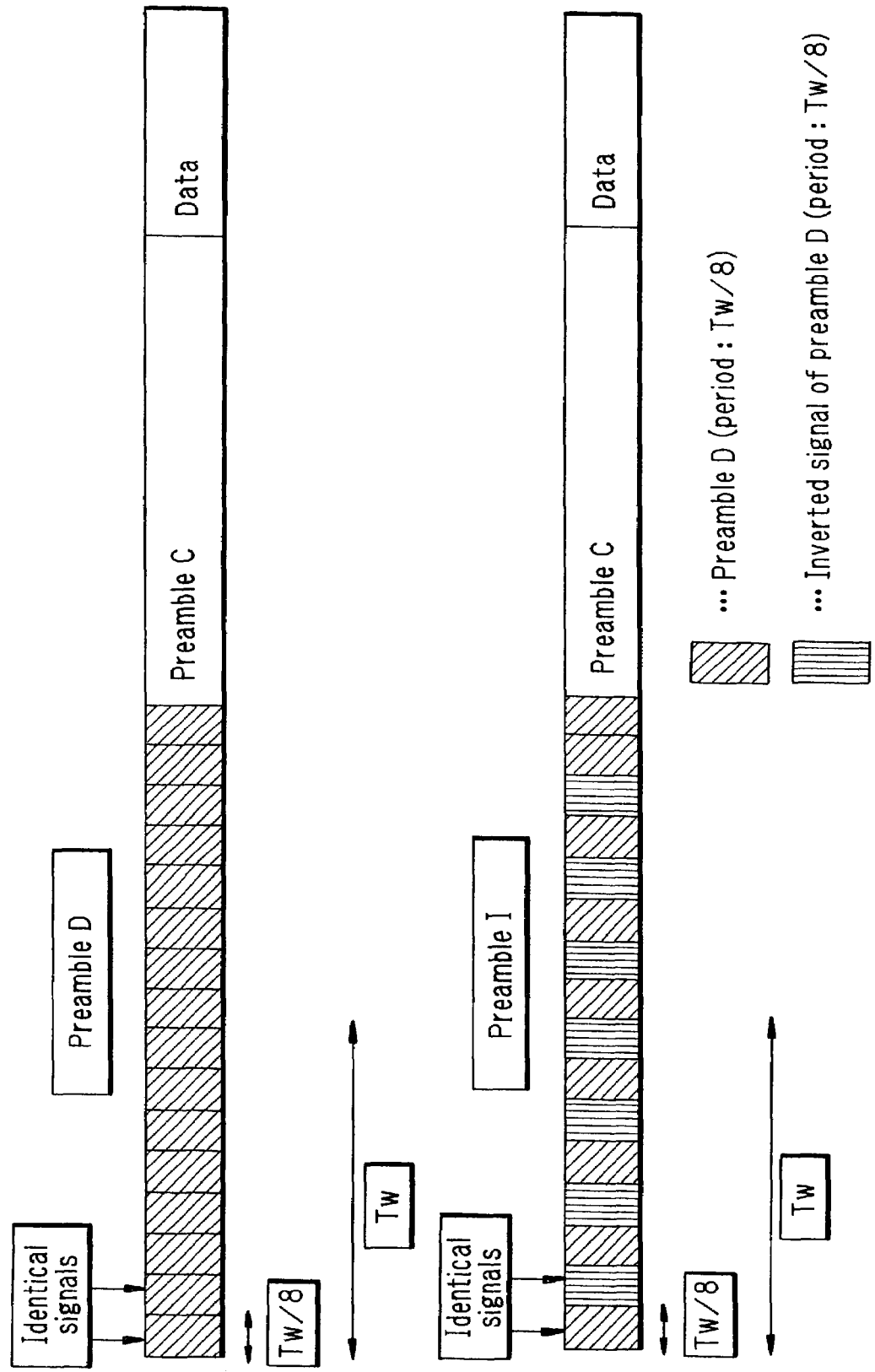
FIG. 28 is an illustrative view showing signals containing two types of preambles (preambles D and I) used in the fifth embodiment of the present invention.

Next, the fifth embodiment of the present invention will be described with reference to FIGS. 28 to 30. Here, the same components as in the first to fourth embodiments of the present invention are allotted with the same reference numerals and description is omitted.

The transmitter of the present embodiment is different from the first embodiment, described above with reference to FIG. 2, in the preamble signal stored in memory 7 only, so that this preamble signal will be described below.

Here, as shown in FIG. 25, the signal having a period of Tw/8 shown in the first embodiment is used as preamble D and another signal sequence, which is formed by modifying preamble D by having signal values inverted every other period (positive values made negative and vice-versa, along the time axis) forming preamble H (the fourth embodiment) and further modifying preamble H by inverting the signal value in one period, is used as a preamble I. Here, designation of the period and the positions where signal values are inverted should not be limited to this.

The receiver of the present embodiment is different from the third embodiment, described above with reference to FIG. 16, only in that the correlation output comparing circuit 15G is replaced by a correlation output circuit 15I capable of identifying preamble I, so this correlation output circuit 15I will be described.

Figure 29:
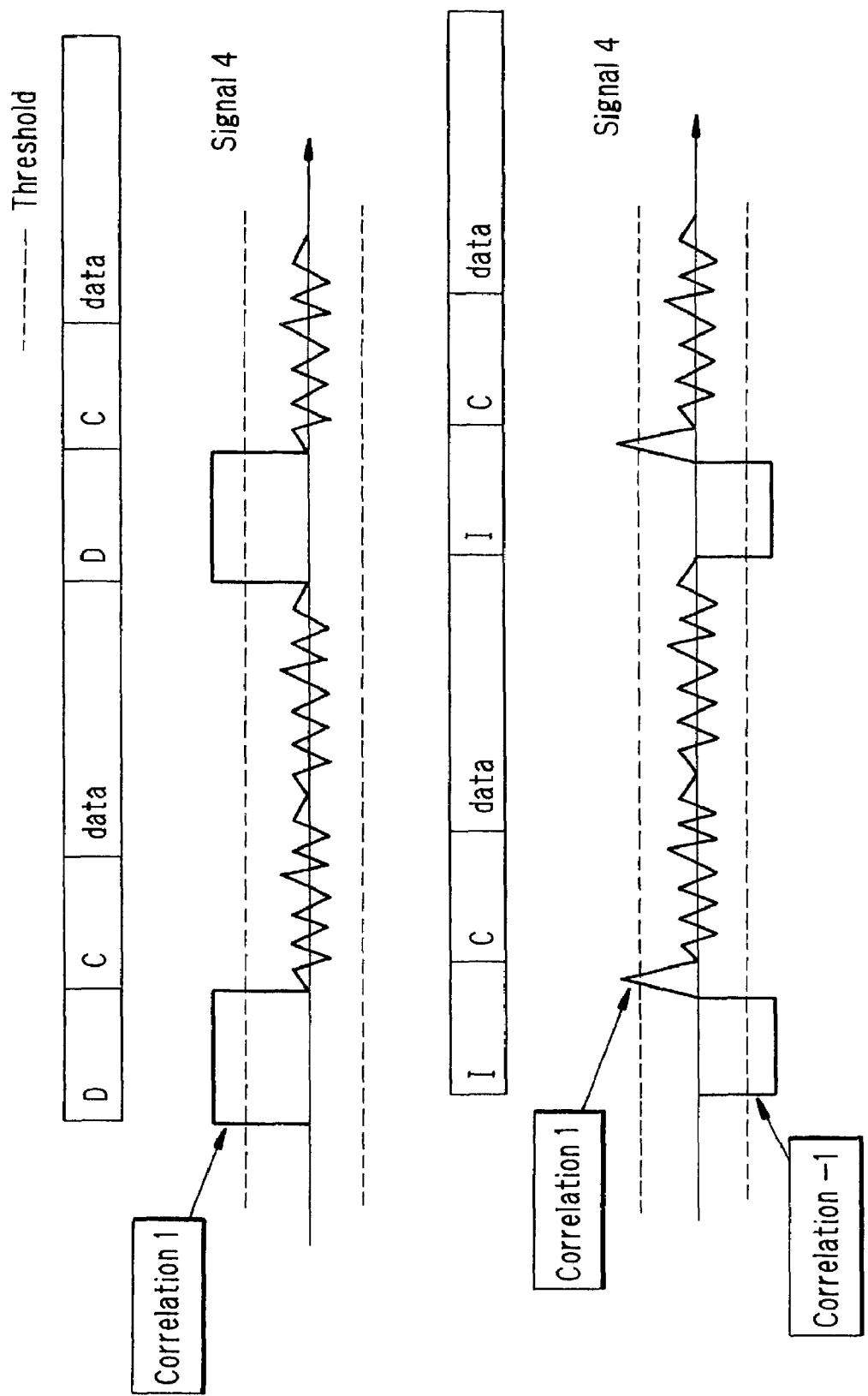
FIG. 29 is an illustrative view showing delay correlator outputs (real part outputs) when preambles D and I are received in the fifth embodiment of the present invention.

FIG. 29 shows the real part of the output (signal 4) from delay correlator D (the calculation of the correlation value between the received signal and a delayed signal of the received signal by Tw/8) when a signal containing preamble D or I is received.

When preamble D is received, signal 4 presents a correlation value of 1, whereas, when preamble I is received, the signal presents a correlation value of 1 in the section where the signal values are inverted and presents a correlation value of −1 otherwise. Here, the correlation value used herein is one which is normalized based on the power of the received signal.

Figure 30:
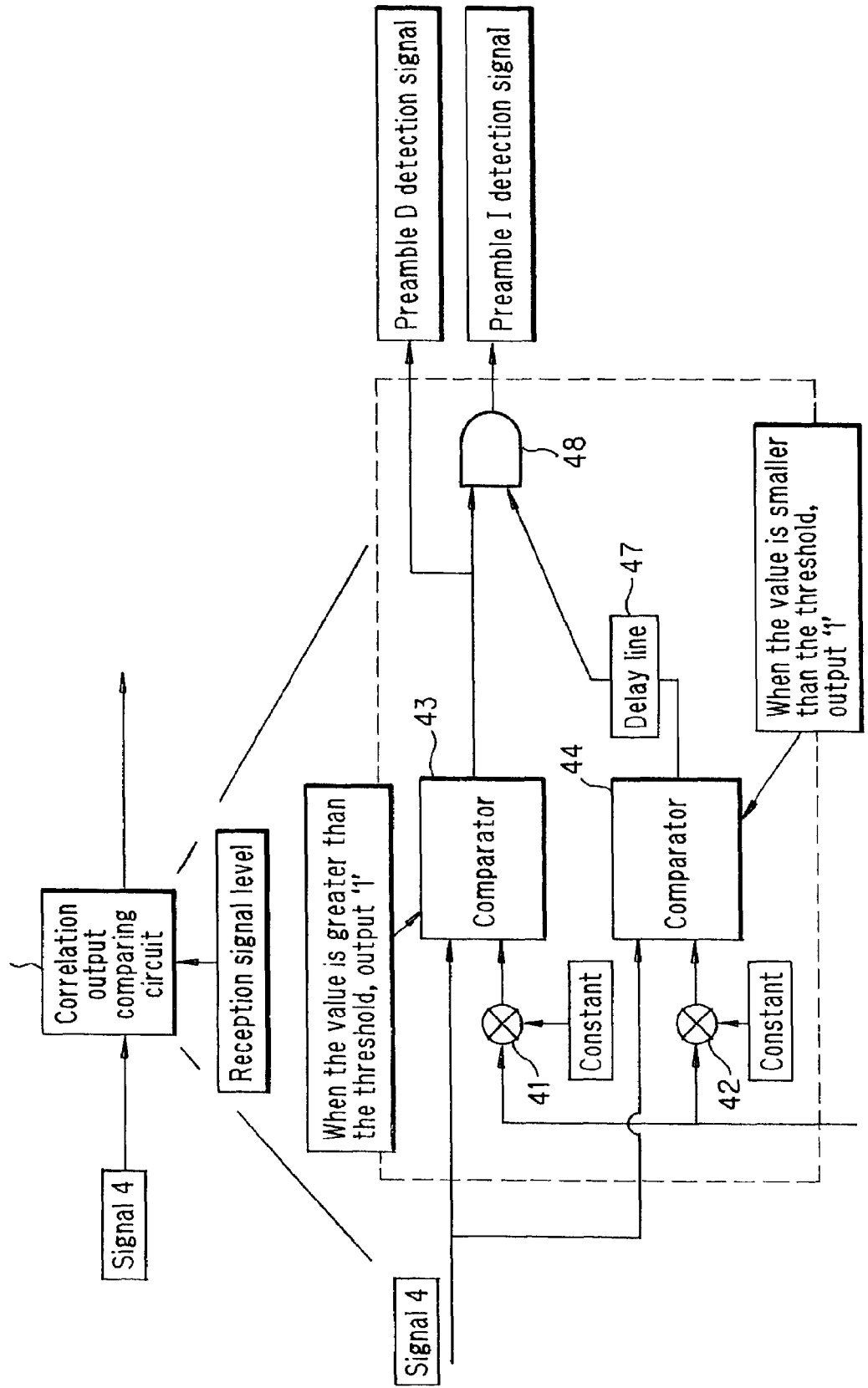
FIG. 30 is a block diagram showing one constructional example of a correlation output comparing circuit capable of identifying preambles D and I in the fifth embodiment of the present invention.

Referring next to FIG. 30, one constructional example of correlation output comparing circuit 15I will be described. This correlation output comparator 15I is comprised of multipliers 41 and 42 for multiplying the reception signal level by a constant, a comparator 43 for comparing signal 4 with the product of the reception signal level and a constant (positive number), a comparator 44 for comparing signal 4 with the product of the reception signal level and a constant (negative number) and an AND circuit 48 for implementing an AND operation between the output from comparator 43 and a delayed signal of the output from comparator 44.

Accordingly, in the present embodiment, use of preamble I realizes its easy discrimination from preamble D. Further, similarly to the first and third embodiments, use of correlation output comparing circuit 15D shown in FIG. 16 also makes it possible to discriminate between preambles having different periods. As a result, it is possible to easily increase the kinds of discriminable preambles. Also in this embodiment, the application is not limited to transmitter-receivers based on OFDM signals.

THE SIXTH EMBODIMENT

Figure 31:
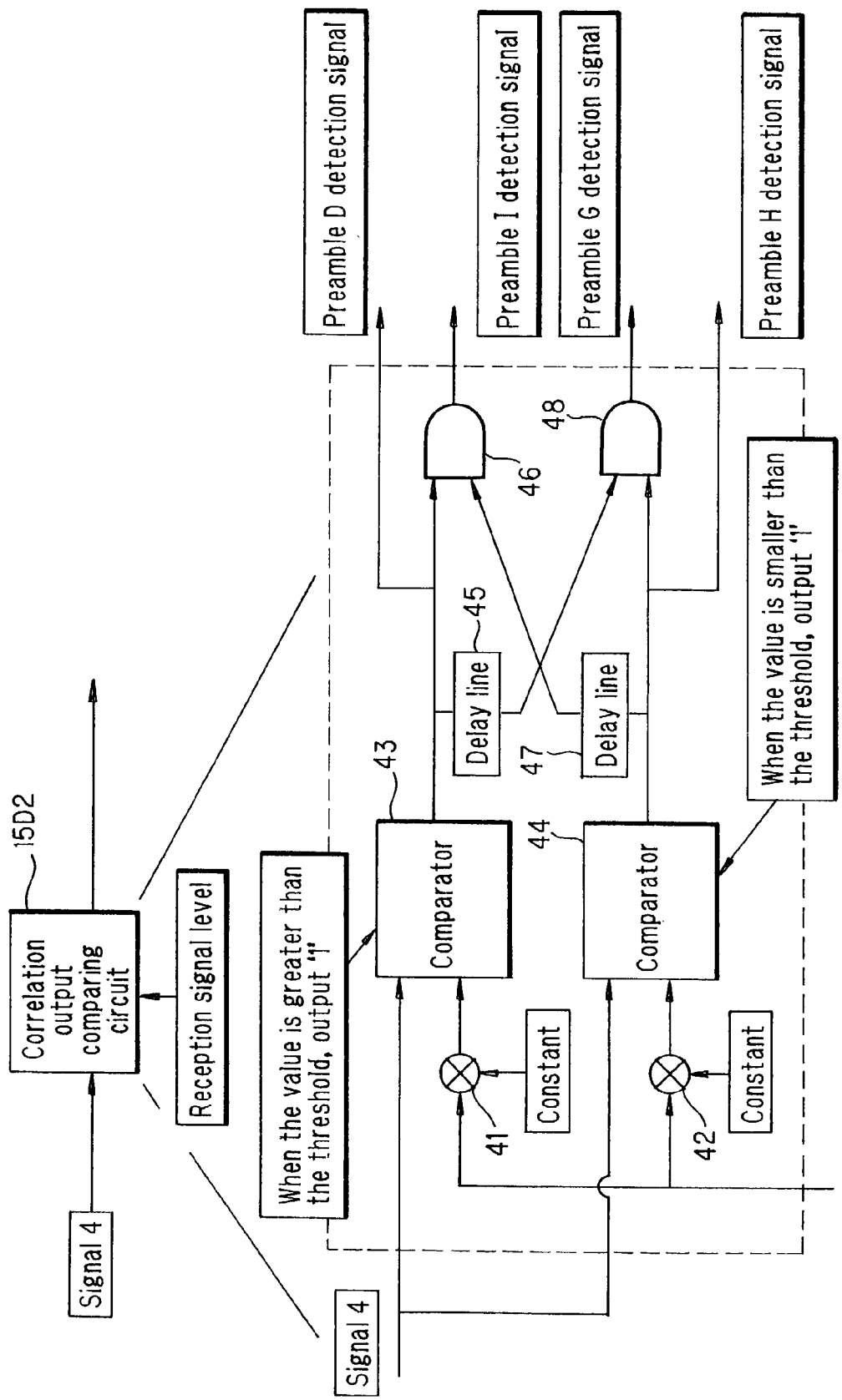
FIG. 31 is a block diagram showing one constructional example of a correlation output comparing circuit capable of identifying preambles D, G, H and I in the sixth embodiment of the present invention.

Next, the sixth embodiment of the present invention will be described with reference to FIG. 31. Here, the same components as in the first to fifth embodiments of the present invention are allotted with the same reference numerals and description is omitted.

The transmitter of the present embodiment is different from the first embodiment, described above with reference to FIG. 2, in the respect that the preamble signal stored in memory 7 is one of the preamble signals described in the first through third embodiments. Therefore, description of these preamble signals is omitted.

The receiver of the present embodiment is different from the third embodiment, described above with reference to FIG. 16, only in that the correlation output comparing circuit 15G is replaced by a correlation output circuit 15D2 capable of identifying preamble I, so this correlation output circuit 15D2 will be described hereinbelow with reference to FIG. 31.

Correlation output comparator 15D2 is comprised of multipliers 41 and 42 for multiplying the reception signal level by a constant, a comparator 43 for comparing signal 4 with the product of the reception signal level and a constant (positive number), a comparator 44 for comparing signal 4 with the product of the reception signal level and a constant (negative number), an AND circuit 46 for implementing an AND operation between the output from comparator 43 and a delayed signal of the output from comparator 44 and an AND circuit 48 for implementing an AND operation between a delayed signal of the output from comparator 43 and the output from comparator 44.

Accordingly, in the present embodiment, use of any one of preambles G, H and I realizes its easy discrimination from preamble D. Further, similarly to the first and third embodiments, use of correlation output comparing circuit 15D shown in FIG. 16 also makes it possible to discriminate between preambles having different periods.

As a result, it is possible to easily increase the kinds of discriminable preambles. Also in this embodiment, the application is not limited to transmitter-receivers based on OFDM signals.

THE SEVENTH EMBODIMENT

Next, the seventh embodiment of the present invention will be described with reference to FIGS. 32 to 37. Here, the same components as in the first embodiment of the present invention are allotted with the same reference numerals and description is omitted.

The transmitter of the present embodiment is different from the first embodiment, described above with reference to FIG. 2, in the preamble signal stored in memory 7 only, so that this preamble signal will be described below.

Figure 32:
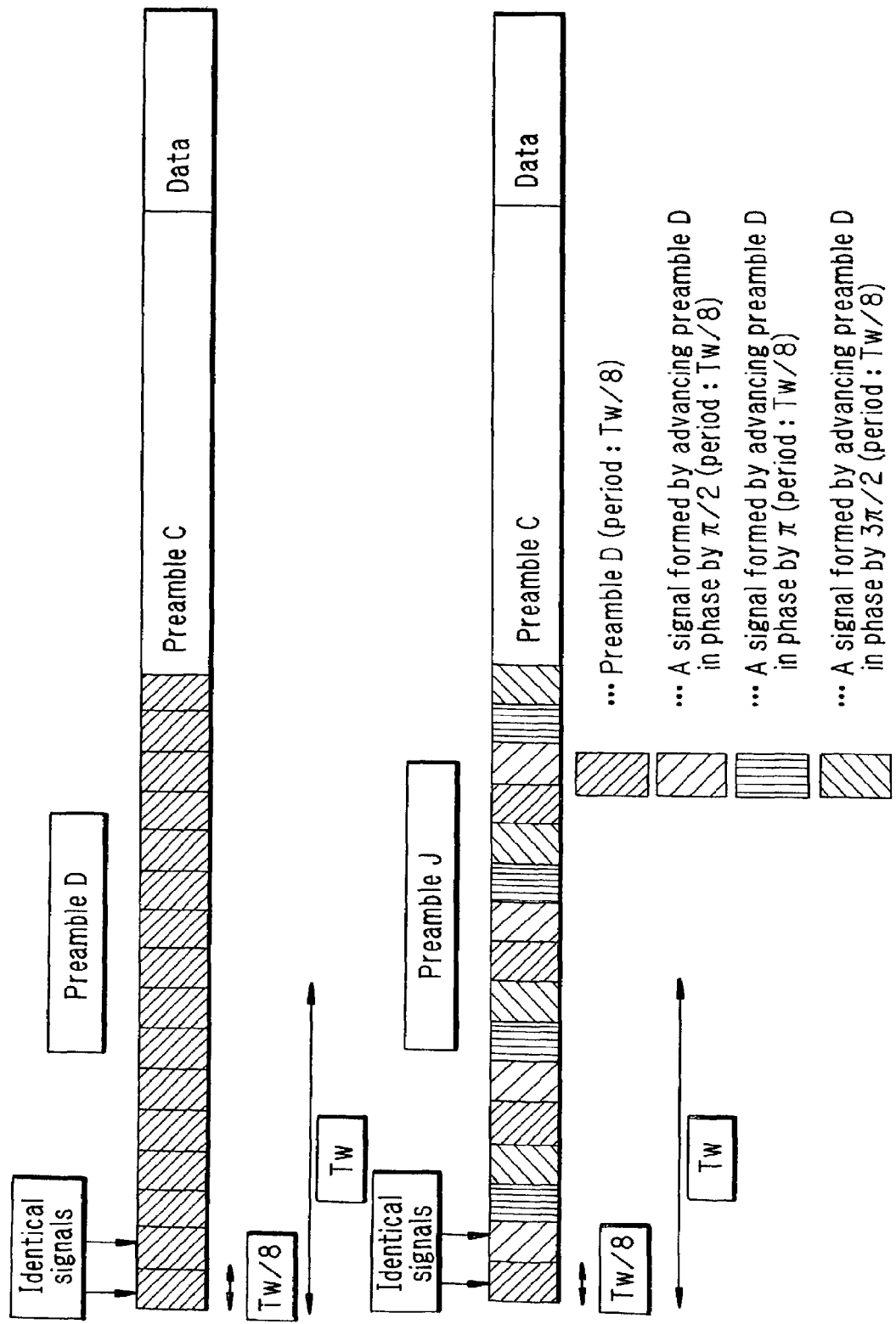
FIG. 32 is an illustrative view showing signals containing two types of preambles (preambles D and J) used in the seventh embodiment of the present invention.

Here, as shown in FIG. 32, the signal having a period of Tw/8 shown in the first embodiment is used as preamble D and another signal, which is modified from preamble D by having its waveform advanced in phase by π/2 every other period is used as a preamble J. Here, the advance in phase by π/2 in this embodiment is a mere example and the waveform may be advanced in phase by L (−π<L<π). Also, the period of the signal should not be limited to this.

The receiver of the present embodiment is different from the first embodiment, described above with reference to FIG. 4, only in that preamble discriminating circuit 13D is replaced by a preamble discriminating circuit 13J capable of identifying preamble J, so this preamble discriminating circuit 13J will be described hereinbelow.

Figure 33:
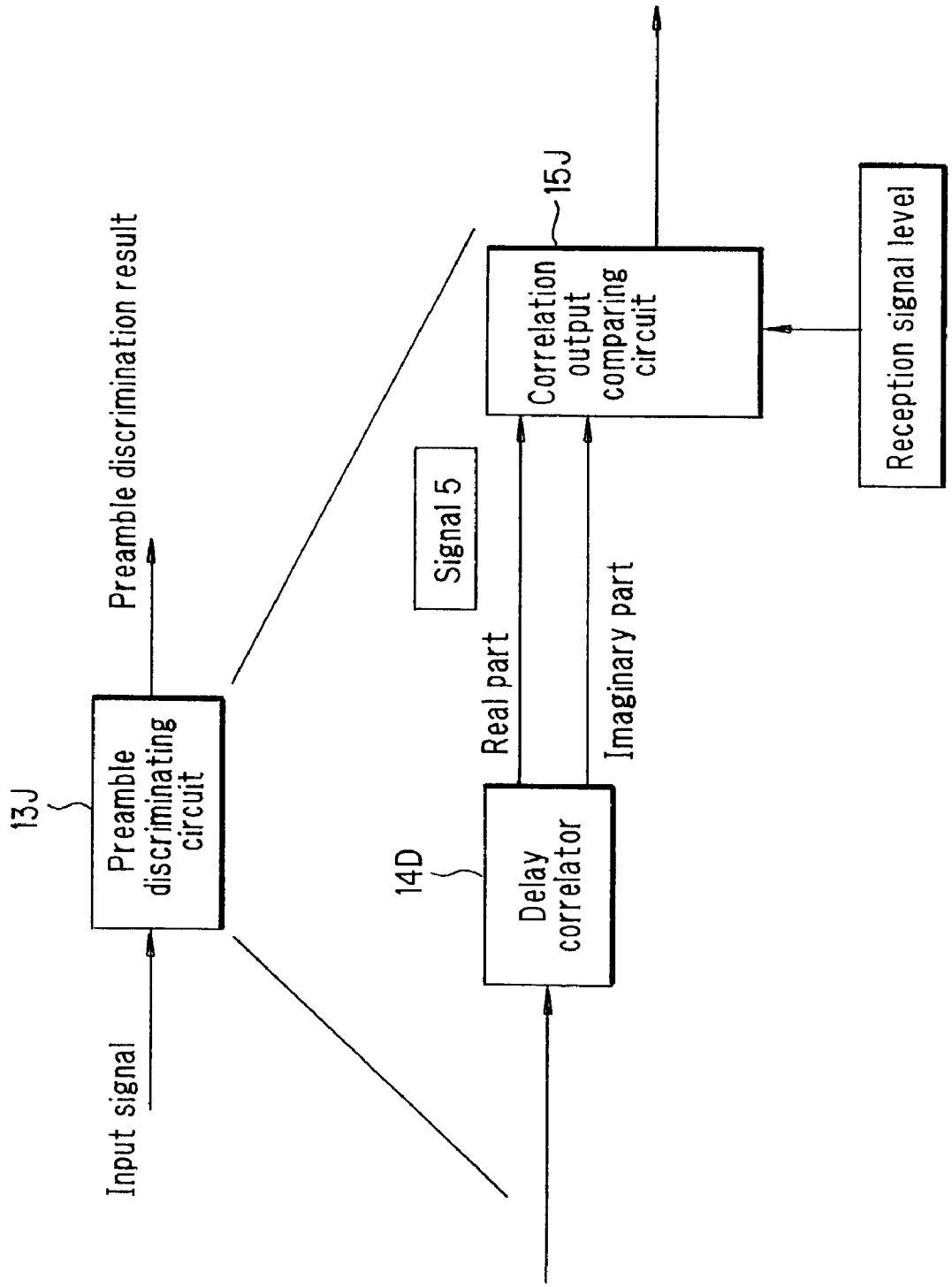
FIG. 33 is a block diagram showing one constructional example of a preamble discriminating circuit capable of identifying preambles D and J in the seventh embodiment of the present invention.

Preamble discriminating circuit 13J is comprised, as shown in FIG. 33, of delay correlator 14D for computing the correlation value between the received signal and a delayed signal of the received signal by Tw/N (Tw: symbol length, N: an integer equal to 1 or greater, N=8 in the drawings) and a correlation output comparing circuit 15J for implementing preamble discrimination (system identification) by comparing the real part output and imaginary part output of the output (a signal 5) from delay correlator 14D, with a threshold determined based on the reception signal level.

Figure 34:
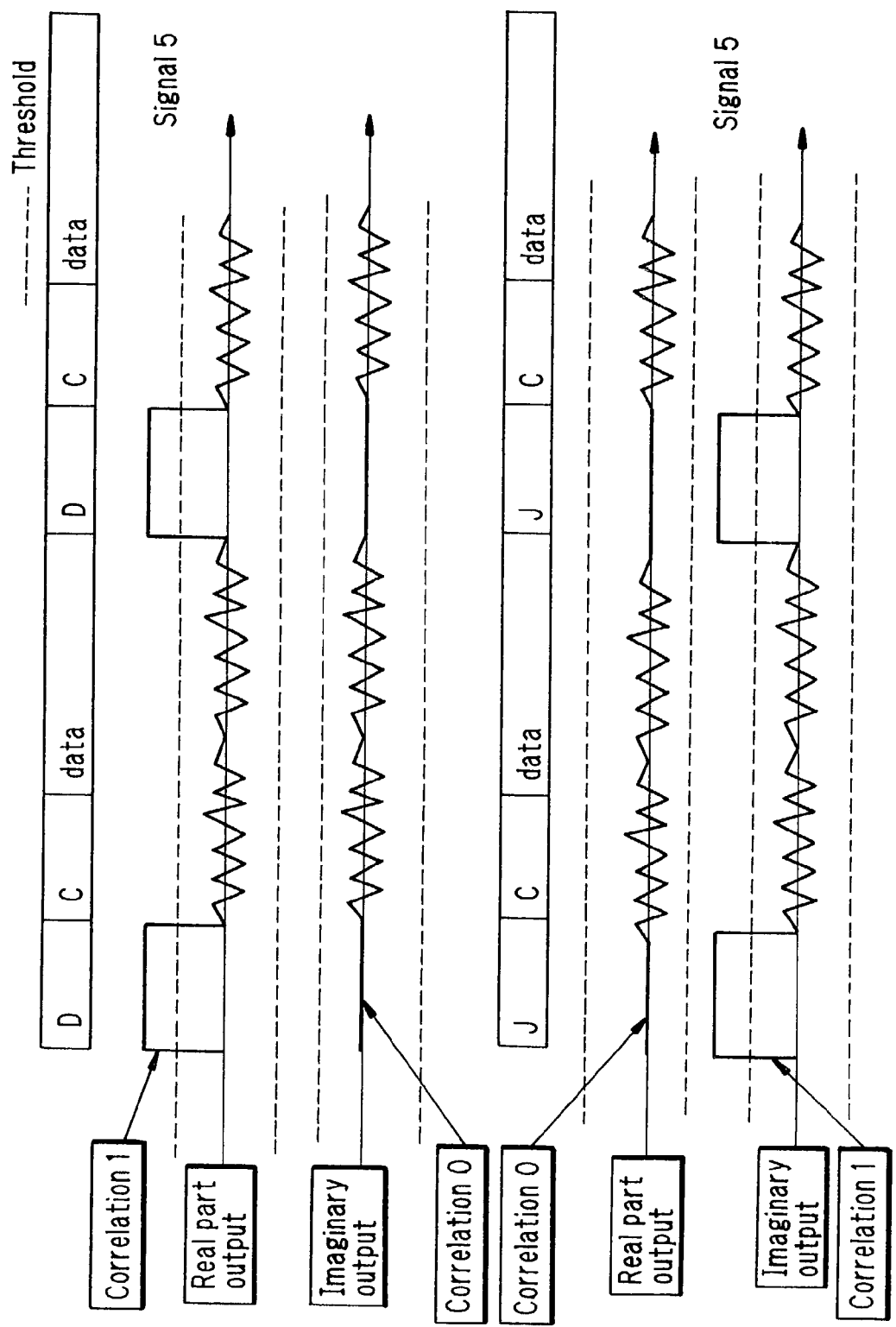
FIG. 34 is an illustrative view showing delay correlator outputs (real part outputs and imaginary part outputs) when preambles D and J are received in the seventh embodiment of the present invention.

FIG. 34 shows the real part and imaginary part of the output (signal 5) from delay correlator 14D (the calculation of the correlation value between the received signal and a delayed signal of the received signal by Tw/8) when a signal containing preamble D or J is received.

When preamble D is received, the real part output presents a correlation value of 1 and the imaginary part output presents a correlation value of 0. When preamble J is received, the real part output presents a correlation value of 0 and the imaginary part output presents a correlation value of 1. Here, the correlation value used herein is one which is normalized based on the power of the received signal.

Accordingly, in the present embodiment, use of preamble J realizes its easy discrimination from preamble D and makes it possible to increase the kinds of discriminable preambles.

Figure 5:
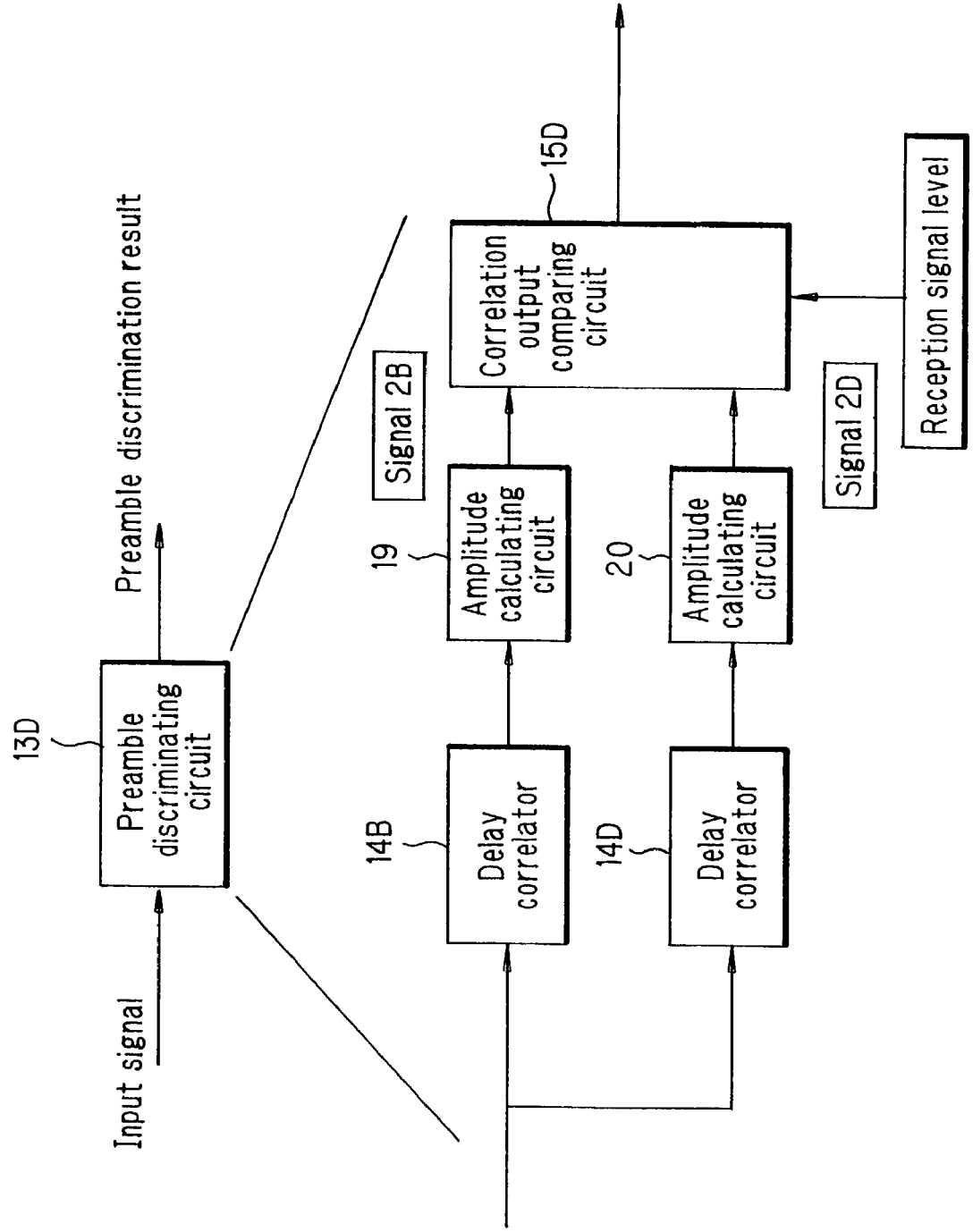
FIG. 5 is a block diagram showing one constructional example of a preamble discriminating circuit which can discriminate between preambles B and D in the first embodiment of the present invention.

Further, it is obvious that use of preamble discriminating circuit 13D described in the first embodiment with reference to FIG. 5 also makes it possible to discriminate between preambles having different periods.

Figure 35:
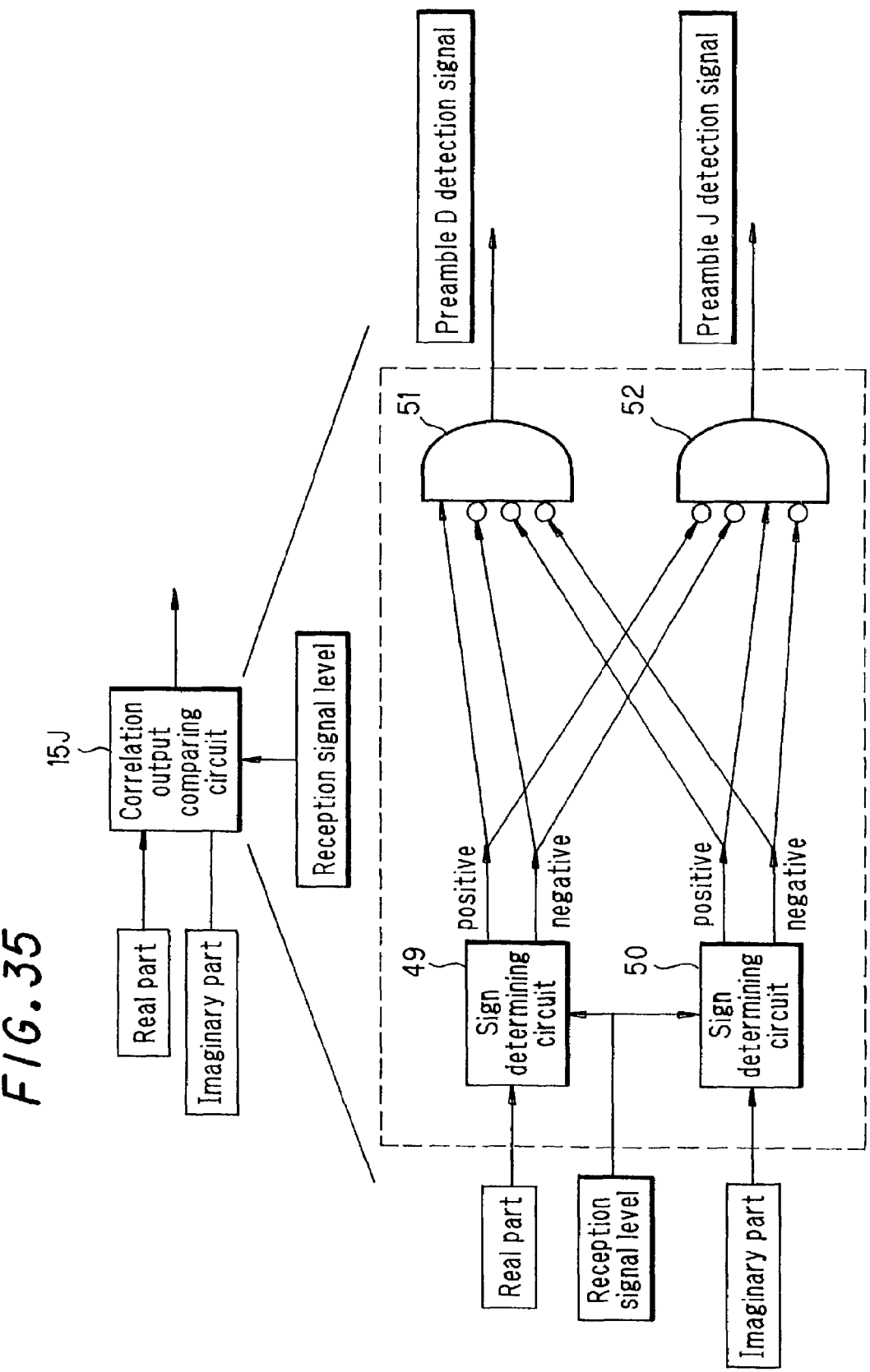
FIG. 35 is a block diagram showing one constructional example of a correlation output comparing circuit capable of identifying preambles D and J in the seventh embodiment of the present invention.

Referring next to FIG. 35, one constructional example of correlation output comparator 15J in this embodiment will be described. Correlation output comparator 15J is comprised of sign determining circuits 49 and 50 which respectively compare the real part output and the imaginary part output of the output from the correlator with the reception signal level, and an AND circuit 51 for implementing an AND operation of the positive output from sign determining circuit 49, the inversion of the negative output from sign determining circuit 49, the inversion of the positive output from sign determining circuit 50 and the inversion of the negative output from sign determining circuit 50, and an AND circuit 52 for implementing an AND operation of the inversion of the positive output from sign determining circuit 49, the inversion of the negative output from sign determining circuit 49, the positive output from sign determining circuit 50 and the inversion of the negative output from sign determining circuit 50.

Figure 36:
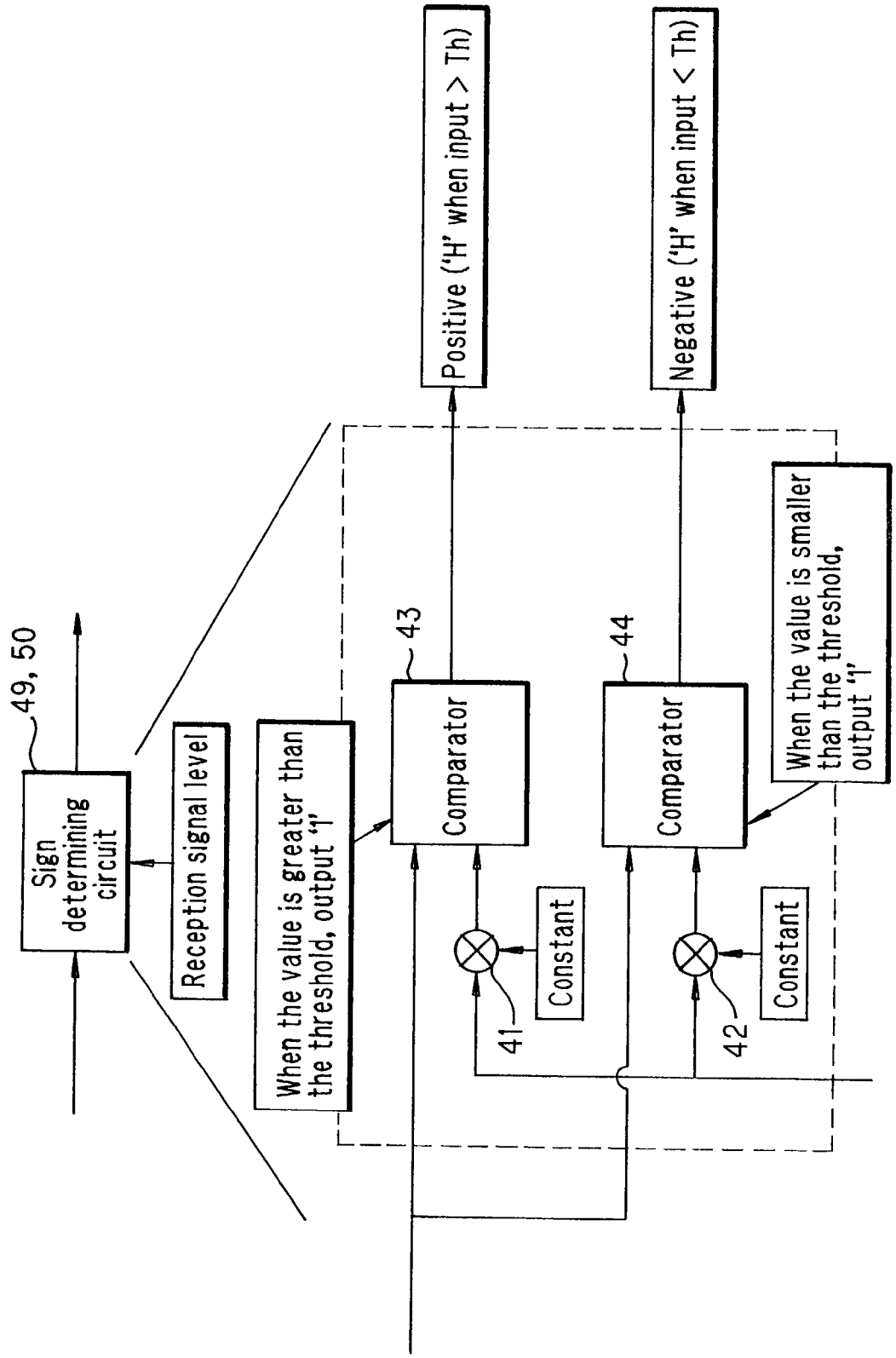
FIG. 36 is a block diagram showing one constructional example of a sign determining circuit in the seventh embodiment of the present invention.

Further, as shown in FIG. 36, each of sign determining circuits 49 and 50 is comprised of multipliers 41 and 42 for multiplying the reception signal level by a constant, a comparator 43 for comparing the input with the product of the reception signal level and a constant (positive number) and a comparator 44 for comparing the input with the product of the reception signal level and a constant (negative number).

Figure 37:
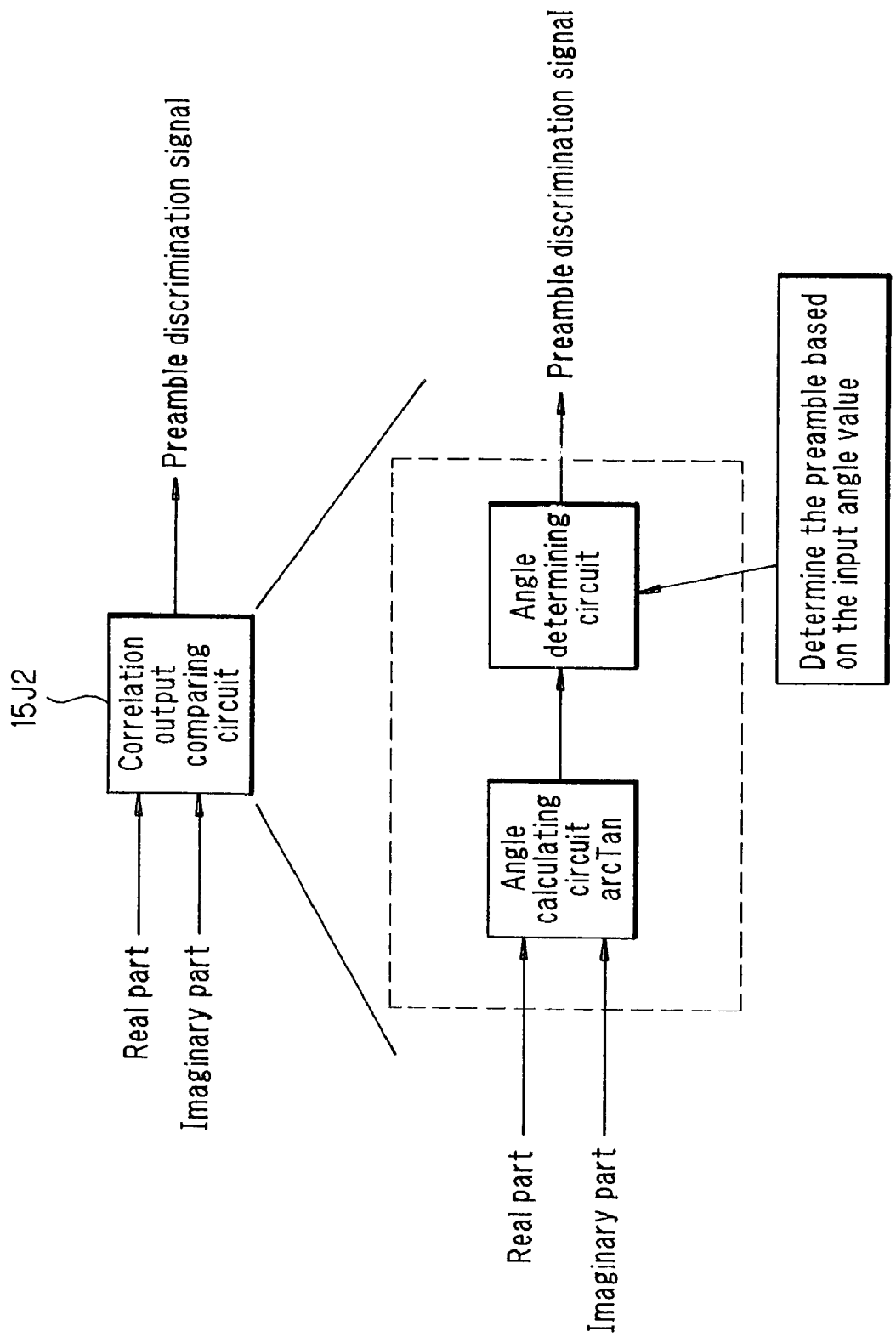
FIG. 37 is an illustrative view showing one constructional example of another correlator output comparing circuit of the seventh embodiment of the present invention.

Here, these circuit configurations are mere examples, so the embodiment should not be limited to these, and other configurations can be used. For example, as shown in FIG. 37, other configurations such as a circuit 15J2 for implementing preamble identification based on the angle determined by the real part and imaginary part of the output from the delay correlator may be used. Also in this embodiment, the application is not limited to transmitter-receivers based on OFDM signals.

THE EIGHTH EMBODIMENT

Next, the eighth embodiment of the present invention will be described with reference to FIGS. 38 to 40. Here, the same components as in the first embodiment of the present invention are allotted with the same reference numerals and description is omitted.

The receiver of the present embodiment is different from the first embodiment, described above with reference to FIG. 4, only in that the preamble discriminating circuit 13D is replaced by a preamble discriminating circuit 13D3 which has resistance to noise, so this preamble discriminating circuit 13D3 will be described below.

Figure 38:
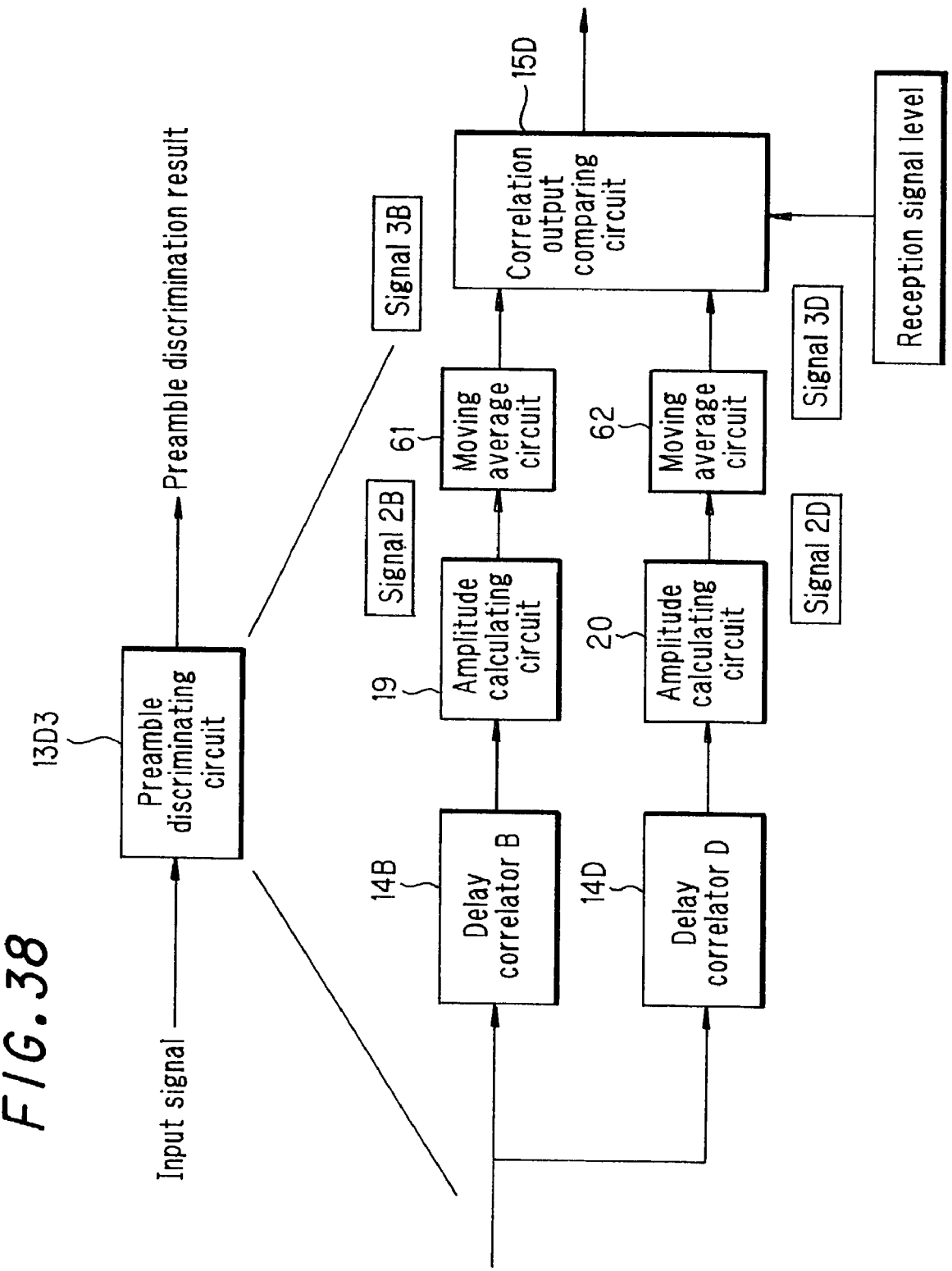
FIG. 38 is a block diagram showing one constructional example of a preamble discriminating circuit in the eighth embodiment of the present invention.

Preamble discriminating circuit 13D3 of the present embodiment is comprised, as shown in FIG. 38, of delay correlators 14B and 14D for computing the correlation value between the received signal and a delayed signal of the received signal by Tw/N (Tw: symbol length, N: an integer equal to 1 or greater), amplitude calculating circuits 19 and 20 for calculating the amplitudes of the outputs from delay correlators 14B and 14D, moving average circuits 61 and 62 for calculating the sum of a certain number of outputs from respective amplitude calculating circuits 19 and 20, and a correlation output comparing circuit 15D for performing preamble identification(system identification) by comparing the outputs from moving average circuits 61 and 62 with a threshold determined based on the reception signal level.

Here, the preamble discriminating circuit 13D3 in this embodiment is the same as that described in the first embodiment except for moving average circuits 61 and 62.

Figure 39:
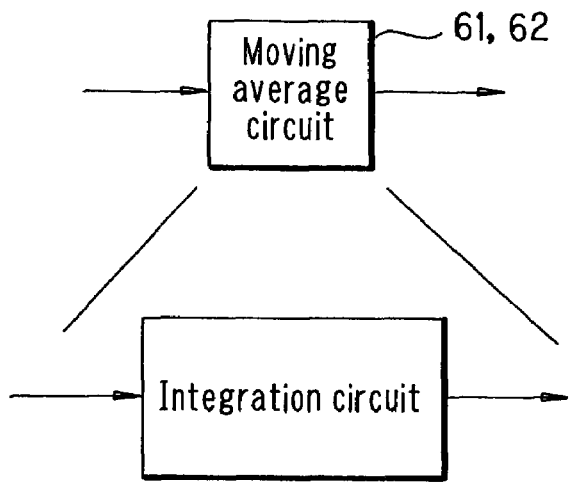
FIG. 39 is a block diagram showing one constructional example showing a moving average circuit in the eighth embodiment of the present invention.
Figure 40:
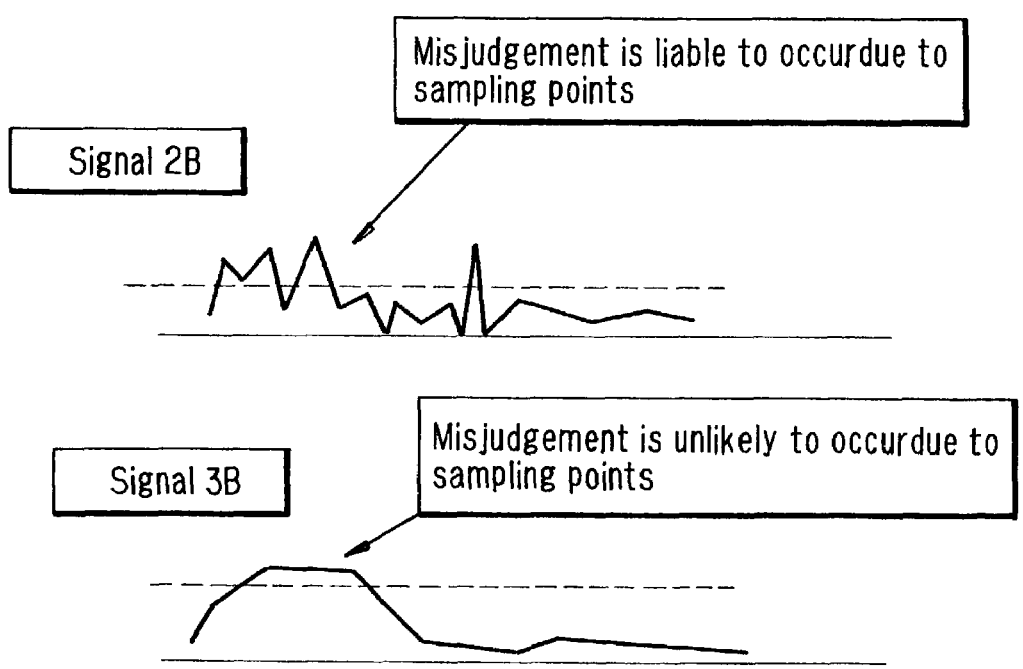
FIG. 40 is an illustrative view showing the effect of a moving average circuit in the eighth embodiment of the present invention.
Figure 41:
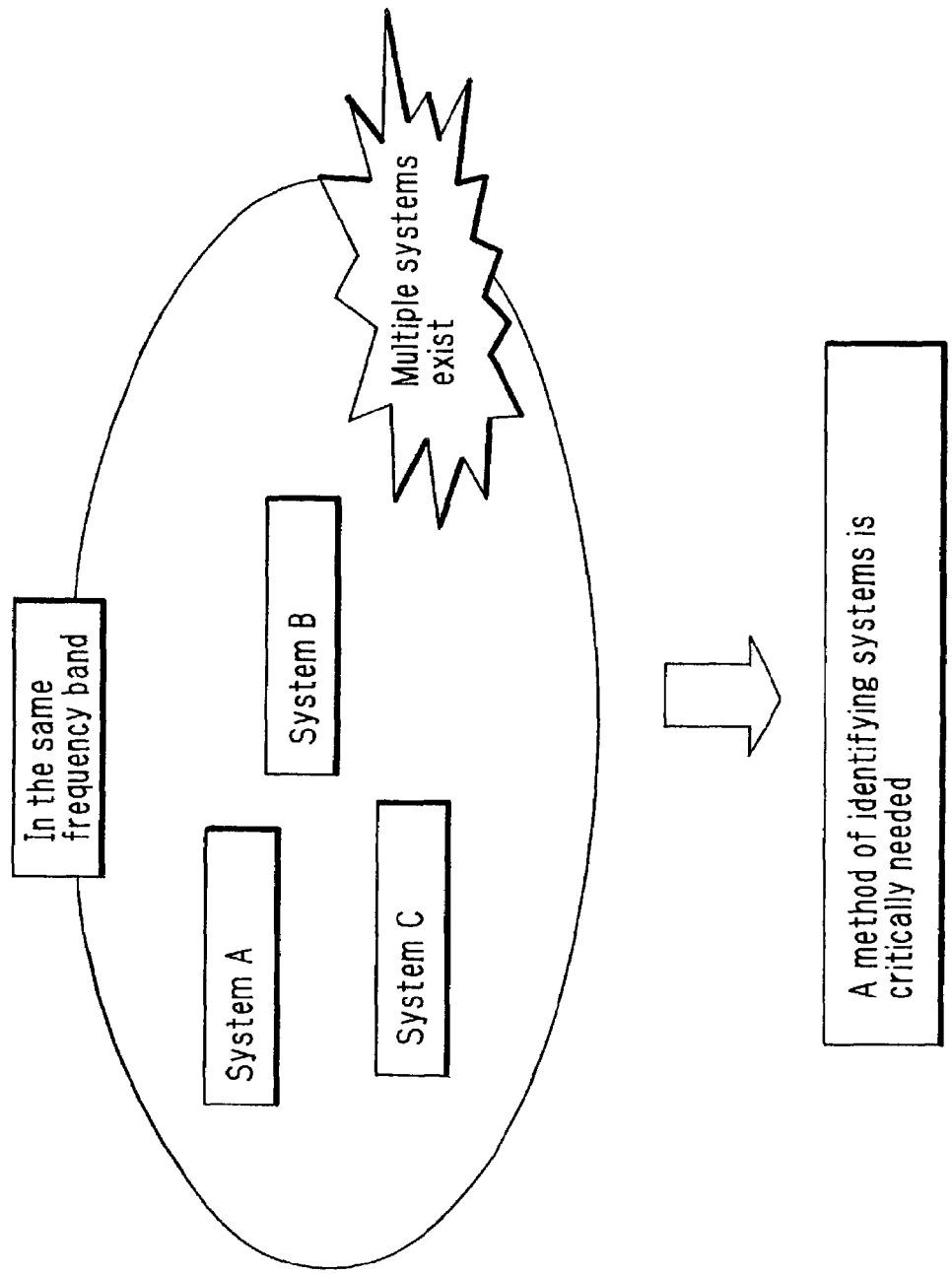
FIG. 41 is an illustrative view showing the state where multiple systems shares the same frequency band.
Figure 42:
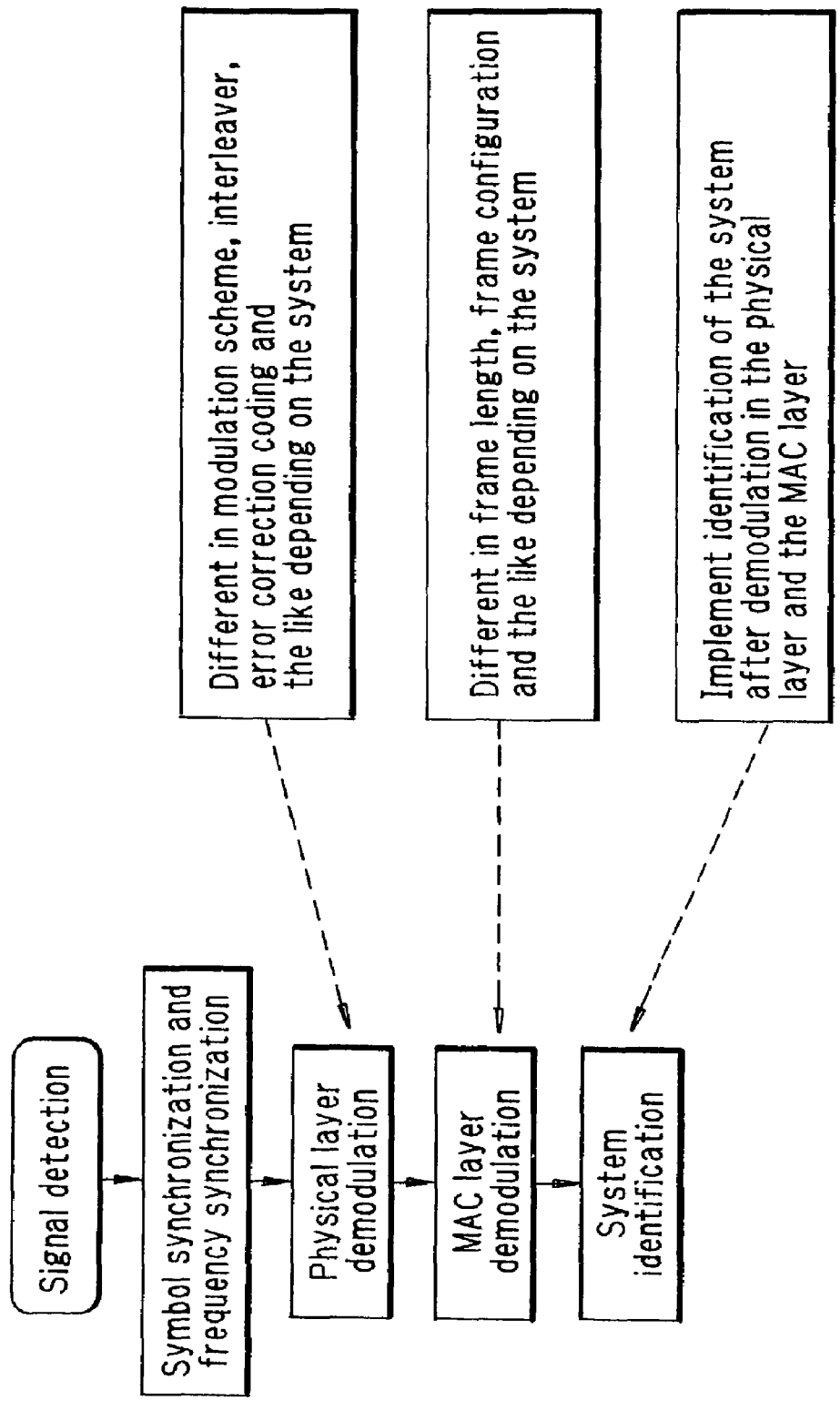
FIG. 42 is an illustrative view showing the operational flow in a conventional receiver for identifying a system after its detection, synchronization, physical layer demodulation and MAC layer demodulation.

The moving average circuits 61 and 62 each are composed of an integrating circuit that adds up a certain number of inputs, as shown in FIG. 39. Use of moving average circuits 61 and 62 makes it possible to smoothen the output signal (as a signal 3B) as shown in FIG. 40 even if signal 2B (the amplitude of the sliding correlation value) is distorted due to noise and other influences. Therefore, it is possible to reduce misjudgment in preamble discrimination depending on the points of sampling.

It should be noted that application of moving average circuits 61 and 62 of the present embodiment is not limited to the preamble discriminating circuit in the first embodiment only but it is obvious that these circuits can be applied to the preamble discriminating circuits in the above second to sixth embodiments.

REFERENCES COMMON TO ALL THE EMBODIMENTS

As has been described heretofore, it is possible to facilitate discrimination between preamble signals by making each preamble signal have periodicity or have a particular pattern sequence. Apart from this, when OFDM signals are used for preambles, the distribution of the signal amplitudes will conform to a Gaussian distribution. As a result, this may cause peaking in the reception signal and exert adverse effects on AGC and the like.

In order to avoid this, the preamble signal sequences should be generated so that the ratio of $MAX|S(t)|^2$ to $AVE|S(t)|2$ (where MAX : the maximum value, AVE : the average) is equal to or smaller than 3 dB, where S(t) is the time signal when the frequency data is subjected to the inverse fast Fourier transform (IFFT).

As an example, when frequency data $SD_{-n,n}$ is set as $SD_{-2e,2e}$=K·{0,0,-1-j1,0,0,0,0,0,0,0,-1+j1,0,0,0,0,0,0,0,-1-j1,0, 0,0,0,0,0,0,0,0,0,0,0,0,0,1+j1,0,0,0,0,0,0,0,-1-j1, 0,0, 0,0,0,0,0,-1-j1,0,0} (k is a constant), the ratio of MAX $|S(t)|^2$ to $AVE|S(t)|^2$ based on the time signal S(t) in this case becomes equal to 2.88 dB, whereby it is possible to suppress peaking upon reception.

As has been described heretofore, according to the present invention, it is possible to easily discriminate between a plurality of preambles before implementing synchronization and demodulation after reception of a signal. Further, since it is possible to use a common circuit for the synchronization process, frequency offset compensation and the like, it is possible to enhance the resistance to noise. With this configuration, it is possible to identify many systems at an early stage (before establishment of synchronization).

INDUSTRIAL APPLICABILITY

The present invention is suitably applied to a wireless communication transmitter and wireless communication receiver which, when a plurality of communications systems including Internet connection, MPEG2 data transmission, DV (digital video) signal transmission and the like are handled in the same frequency band, can detect an arrival of a signal of the desired system, simply and precisely at an early stage.

The invention claimed is:

1. A wireless communication transmitter comprising:
an encoder for encoding signals of information;
a preamble signal storage for storing a first preamble signal of a known signal sequence; and
an addition portion for adding the first preamble signal to first encoded signals of information,
wherein at least part of the first preamble signal has a symbol length Tw and a first periodicity of $Tw/N_1$ ($N_1$: an integer equal to 1 or greater) for distinguishing the first encoded signals of information from second encoded signals of information having a second preamble signal having a symbol length Tw and a second periodicity $Tw/N_2$, ($N_2$: an integer equal to 1 or greater, $N_1 \neq N_2$).

2. The wireless communication transmitter according to claim 1, wherein the first preamble signal includes signals having the symbol length Tw and the second periodicity $Tw/N_2$.

3. A wireless communication transmitter comprising:
an encoder for encoding signals of information;
a preamble signal storage for storing a preamble signal of a known signal sequence; and
an addition portion for adding the preamble signal to first encoded signals of information,
wherein at least part of the preamble signal has a first periodicity of Tw/N (Tw: symbol length, N: an integer equal to 1 or greater) and part of the signal having the first periodicity, Tw/N, is inverted for distinguishing the first encoded signals of information from second encoded signals of information, and wherein the signal having the first periodicity, Tw/N, is inverted every other period.

4. The wireless communication transmitter according to claim 3, wherein part of the signal which is inverted every other period is further inverted.

5. A wireless communication transmitter comprising:
an encoder for encoding signals of information;
a preamble signal storage for storing a preamble signal of a known signal sequence; and
an addition portion for adding the preamble signal to first encoded signals of information,
wherein at least part of the preamble signal has a first periodicity of Tw/N (Tw: symbol length, N: an integer equal to 1 or greater) and a first part of the signal having the first periodicity, Tw/N, is delayed in phase, every other period of Tw/N, by a lag L ($-\pi < L < \pi$) for distinguishing the first encoded signals of information having the first periodicity from second encoded signals of information.

6. A wireless communication receiver comprising:
a decoder for decoding signals of information sent from a wireless communication transmitter; and
a preamble signal discriminating portion for discriminating between preamble signals of known signal sequences,
wherein the preamble signal discriminating portion comprises:
at least one delay correlator for calculating a correlation value between a received signal and a signal of the received signal delayed by Tw/N (Tw: symbol length, N: an integer equal to 1 or greater); and
a correlation output comparator for comparing an output from the delay correlator with a threshold related to a reception signal level, and
wherein said at least one delay correlator comprises a plurality of the delay correlators and the correlation output comparator compares the amplitude of the output from each delay correlator with the threshold related to the reception signal level.

7. The wireless communication receiver according to claim 6, wherein the correlation output comparator includes:
a first comparator for comparing a first input signal with the product of the reception signal level and a constant;
a second comparator for comparing a second input signal with the product of the reception signal level and a constant;
a first AND circuit for implementing an AND operation between the outputs from the first and second comparators; and
a second AND circuit for implementing an AND operation between the output from the first comparator and the inversion of the output from the second comparator.

8. The wireless communication receiver according to claim 7, further comprising a third AND circuit for implementing an AND operation between the output from the first AND circuit and a delayed signal of the output from the second AND circuit.

9. The wireless communication receiver according to claim 6, wherein the correlation output comparator includes:
a first comparator for comparing a first input signal with the product of the reception signal level and a constant;
a second comparator for comparing a second input signal with the product of the signal level and a constant;
reception signal level and a constant;
a third comparator for comparing a third input signal with the product of the reception signal level and a constant;

a first AND circuit for implementing an AND operation between the outputs from the first, second and third comparators A;

a second AND circuit for implementing an AND operation between the outputs from the first and second comparators and the inversion of the output from the third comparator; and a third AND circuit for implementing an ANT) operation between the output from the first comparator and the inversions of the outputs from the second and third comparators.

10. A wireless communication receiver comprising:

a decoder for decoding signals of information sent from a wireless communication transmitter; and a preamble signal discriminating portion for discriminating between preamble signals of known signal sequences, wherein the preamble signal discriminating portion comprises:

at least one delay correlator for calculating a correlation value between a received signal and a signal of the received signal delayed by Tw/N (Tw: symbol length, N: an integer equal to 1 or greater); and a first correlation output comparator for comparing the amplitude of the output from the delay correlator with a threshold related to a reception signal level;

a second correlation output comparator for comparing the real part and/or imaginary part output from the delay correlator with the threshold related to the reception signal level.

11. The wireless communication receiver according to claim 10, wherein the second correlation output comparator includes:

a first comparator for comparing the input signal with the product of the reception signal level and a constant (positive number); and a second comparator for comparing the input signal with the product of the reception signal level and a constant (negative number).

12. The wireless communication receiver according to claim 11, further comprising: an AND circuit for implementing an AND operation between a delayed signal of the output from the first comparator and the output from the second comparator.

13. The wireless communication receiver according to claim 11, further comprising: an AND circuit for implementing an AND operation between the output from the first comparator and a delayed signal of the output from the second comparator.

14. The wireless communication receiver according to claim 11, further comprising:

a first AND circuit for implementing an AND operation between the output from the first comparator and a delayed signal of the output from the second comparator; and a second AND circuit for implementing an AND operation between a delayed signal of the output from the first comparator and the output from the second comparator.

15. A wireless communication receiver comprising:

a decoder for decoding signals of information sent from a wireless communication transmitter; and a preamble signal discriminating portion for discriminating between preamble signals of known signal sequences, wherein the preamble signal discriminating portion comprises:

a delay correlator for calculating a correlation value between a received signal and a signal of the received signal delayed by Tw/N (Tw: symbol length, N: an integer equal to 1 or greater); and a correlation output comparator for comparing the real part output and imaginary part output from the delay correlator with a threshold related to a reception signal level.

16. The wireless communication receiver according to claim 15, wherein the correlation output comparator includes:

a sign determining circuit which compares the real part output and the imaginary part output from the delay correlator with the reception signal level; and a correlation output comparing circuit having the outputs from the sign determining circuit connected to NOT and AND gates.

17. The wireless communication receiver according to claim 16, wherein the sign determining circuit includes:

a first comparator for comparing the input signal with the product of the reception signal level and a constant (positive number); and a second comparator for comparing the input signal with the product of the reception signal level and a constant (negative number).

18. The wireless communication receiver according to any one of claim 6 through 17, wherein a moving average calculating portion for calculating a moving average of the output from the delay correlator is provided so that preambles are identified based on the moving average value.

19. The wireless communication transmitter according to any one of claims 1, 2, 3, 4 or 5, wherein the signal having the periodicity of Tw/N is generated so that $MAX|S(t)|2/AVE|S(t)|2$ (where MAX: the maximum value, AVE: the average) is equal to or smaller than 3 dB, where $S(t)$ is the time signal when the data sequence is subjected to the inverse fast Fourier transform (IFFT).

20. A wireless communication system comprising first and second transmitters, said first transmitter comprising an encoder for encoding first signals of information, a preamble signal storage for storing a first preamble signal of a known signal sequence, and an addition portion for adding the first preamble signal to the first encoded signals of information; and said second transmitter comprising an encoder for encoding second signals of information, a preamble signal storage for storing a second preamble signal of a known signal sequence, and an addition portion for adding the second preamble signal to the second encoded signals of information;

wherein at least part of the first preamble signal has a first periodicity and at least part of the second preamble signal has a second periodicity different from the first periodicity for distinguishing the first encoded signals of information from the second encoded signals of information.

21. The wireless communication system of claim 20 including a receiver having a preamble signal discriminating portion for discriminating between the first encoded signals of information and the second encoded signals of information based on the periodicities of the preambles.

22. The wireless communication system of claim 21 including:

a delay correlator for calculating a correlation value between a period of a preamble of a received signal and the period of the first periodicity; and a correlation output comparator for comparing the output from the delay correlator with a threshold.

* * * * *